(12) United States Patent
Lee et al.

(10) Patent No.: US 11,142,888 B2
(45) Date of Patent: Oct. 12, 2021

(54) HYDRAULIC MACHINE

(71) Applicant: Volvo Construction Equipment AB, Eskilstuna (SE)

(72) Inventors: Jaehoon Lee, Gyeongsangnam-do (KR); Sanghee Lee, Gyeongsangnam-do (KR); Taehoon Kim, Gyeongsangnam-do (KR)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 16/771,853

(22) PCT Filed: Dec. 14, 2017

(86) PCT No.: PCT/KR2017/014777
§ 371 (c)(1),
(2) Date: Jun. 11, 2020

(87) PCT Pub. No.: WO2019/117375
PCT Pub. Date: Jun. 20, 2019

(65) Prior Publication Data
US 2021/0172155 A1 Jun. 10, 2021

(51) Int. Cl.
*E02F 9/22* (2006.01)
*F15B 13/02* (2006.01)
*F15B 13/06* (2006.01)

(52) U.S. Cl.
CPC .......... *E02F 9/2228* (2013.01); *E02F 9/2242* (2013.01); *F15B 13/025* (2013.01); *F15B 13/06* (2013.01)

(58) Field of Classification Search
CPC . F15B 13/06; F15B 2211/2656; E02F 9/2228; E02F 9/2242
See application file for complete search history.

(56) References Cited

U.S. PATENT DOCUMENTS 5,303,551 A 4/1994 Lee
7,607,245 B2 * 10/2009 Satake .................. E02F 9/2235
37/348

(Continued)

FOREIGN PATENT DOCUMENTS

WO WO-2016175352 A1 * 11/2016 ............ E02F 9/2282

OTHER PUBLICATIONS

International Search Report and Written Opinion of the International Searching Authority, PCT/KR2017/014777, dated Sep. 10, 2018, 10 pages.

(Continued)

*Primary Examiner* — Thomas E Lazo
(74) *Attorney, Agent, or Firm* — Sage Patent Group

(57) ABSTRACT

A first required flow rate is calculated as a function of a first maximum allowable flow rate and a value of a first signal. A second required flow rate is calculated as a function of a value of the second signal. When the first maximum allowable flow rate is higher than a first capacity, the value of the first signal is a maximum level, and the value of the second signal is equal to or higher than a minimum level and equal to or lower than a maximum level, a first working fluid supply is controlled to discharge working fluid at a flow rate equal to the first capacity, and a second working fluid supply is controlled to discharge working fluid at a flow rate obtained by deducting the first capacity from the first maximum allowable flow rate, added to the second required flow rate.

17 Claims, 16 Drawing Sheets

(56) References Cited

U.S. PATENT DOCUMENTS

| | | | |
|---|---|---|---|
| 8,919,115 B2* | 12/2014 | Hagiwara | E02F 9/2239 |
| | | | 60/426 |
| 9,790,665 B2* | 10/2017 | Tajima | F15B 11/167 |
| 10,428,491 B2* | 10/2019 | Joung | E02F 9/2282 |
| 2006/0230753 A1 | 10/2006 | Hesse et al. | |
| 2009/0056324 A1 | 3/2009 | Itakura et al. | |
| 2009/0229261 A1 | 9/2009 | Lin et al. | |
| 2017/0009428 A1 | 1/2017 | Hijikata et al. | |
| 2017/0037600 A1* | 2/2017 | Joung | E02F 9/2232 |

OTHER PUBLICATIONS

International Preliminary Report on Patentability of the International Preliminary Examining Authority, PCT/KR2017/014777, dated May 8, 2020, 7 pages.

* cited by examiner

[Fig. 1]
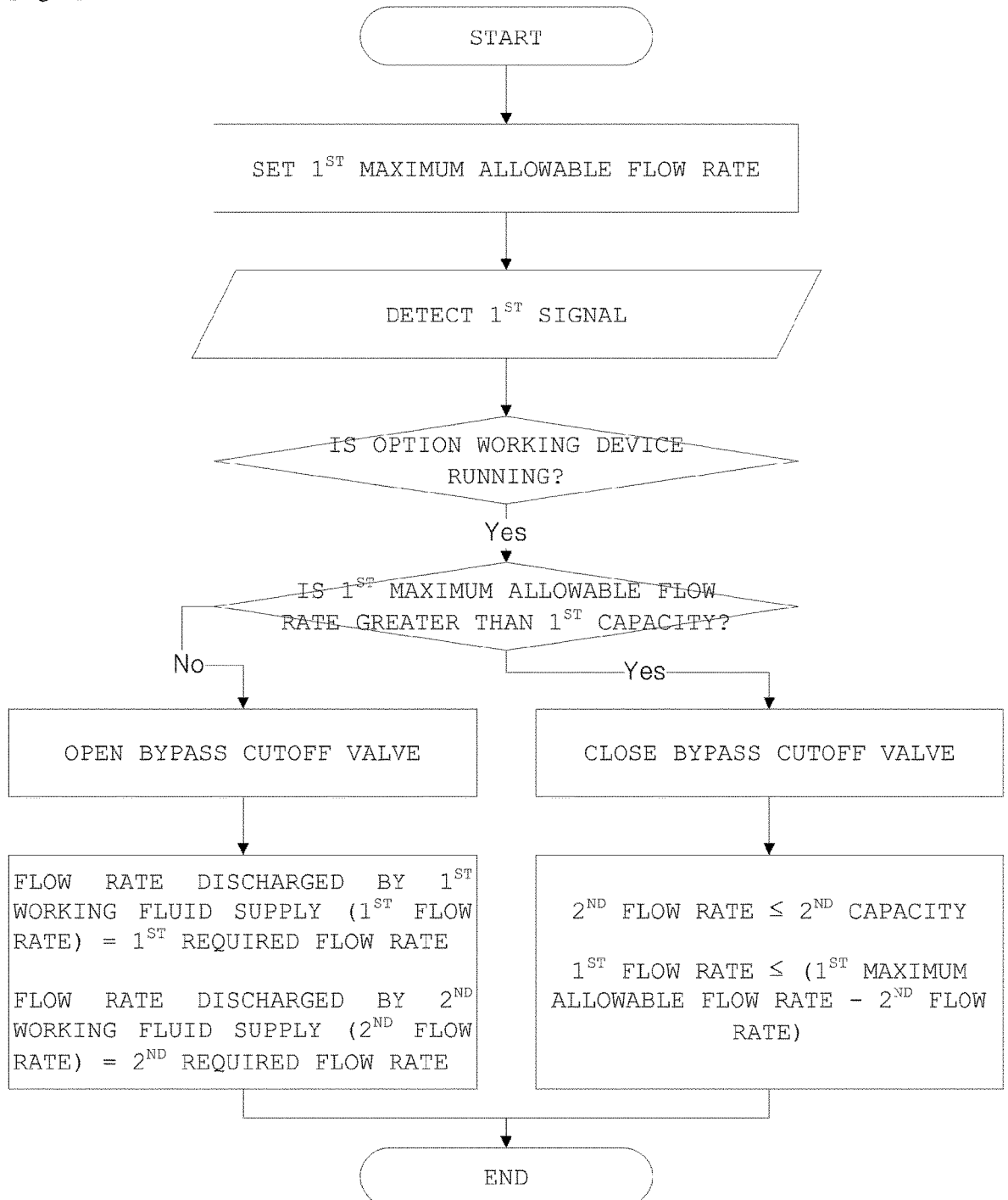

[Fig. 2]
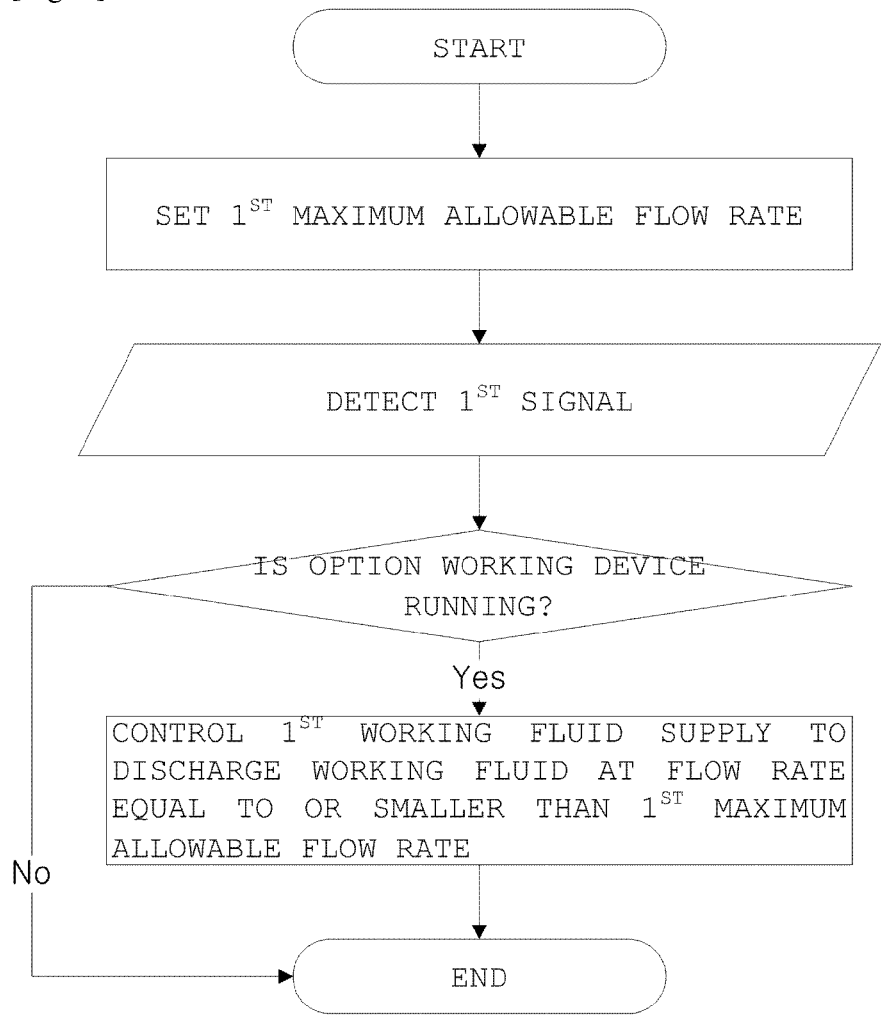

[Fig. 3]
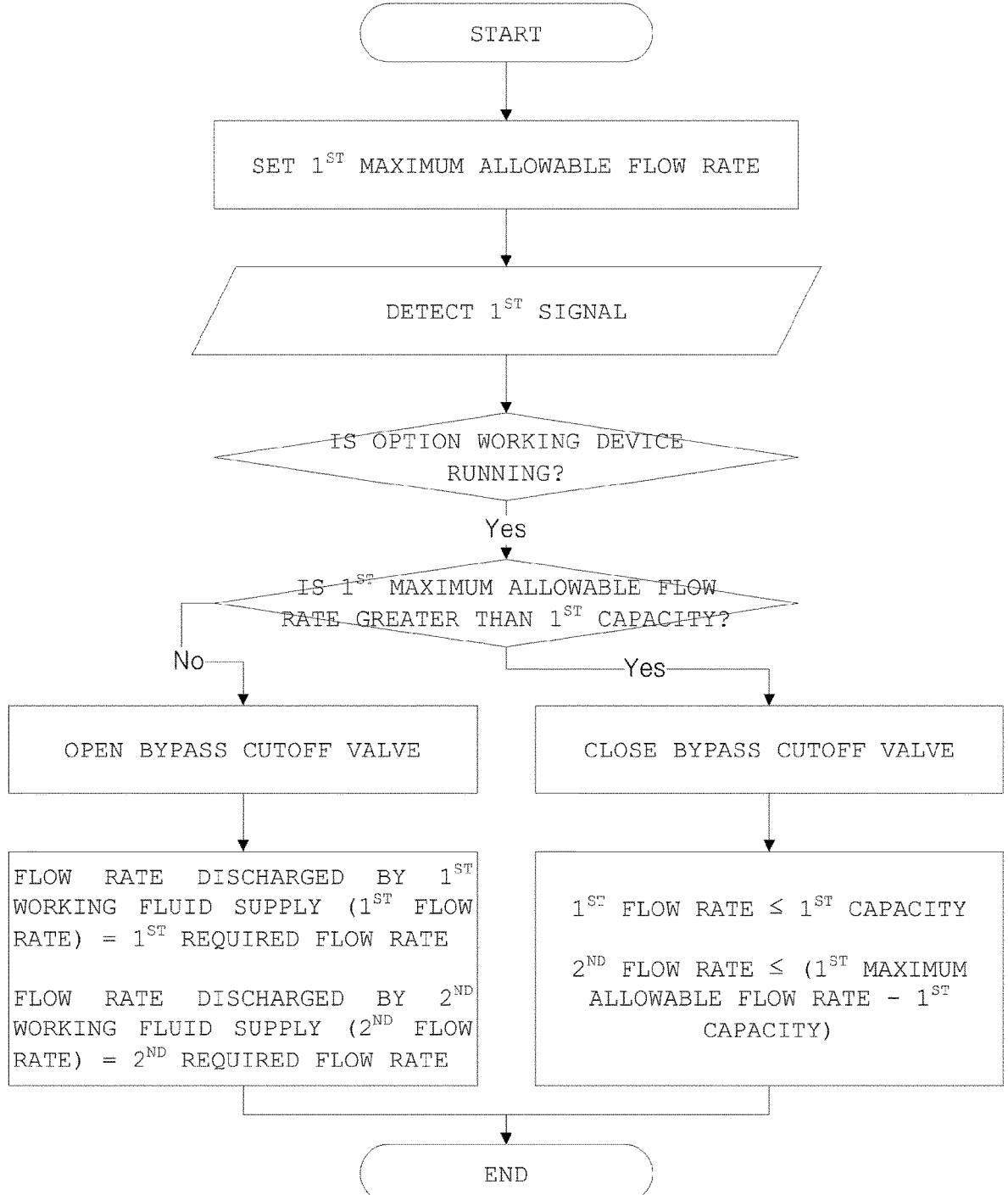

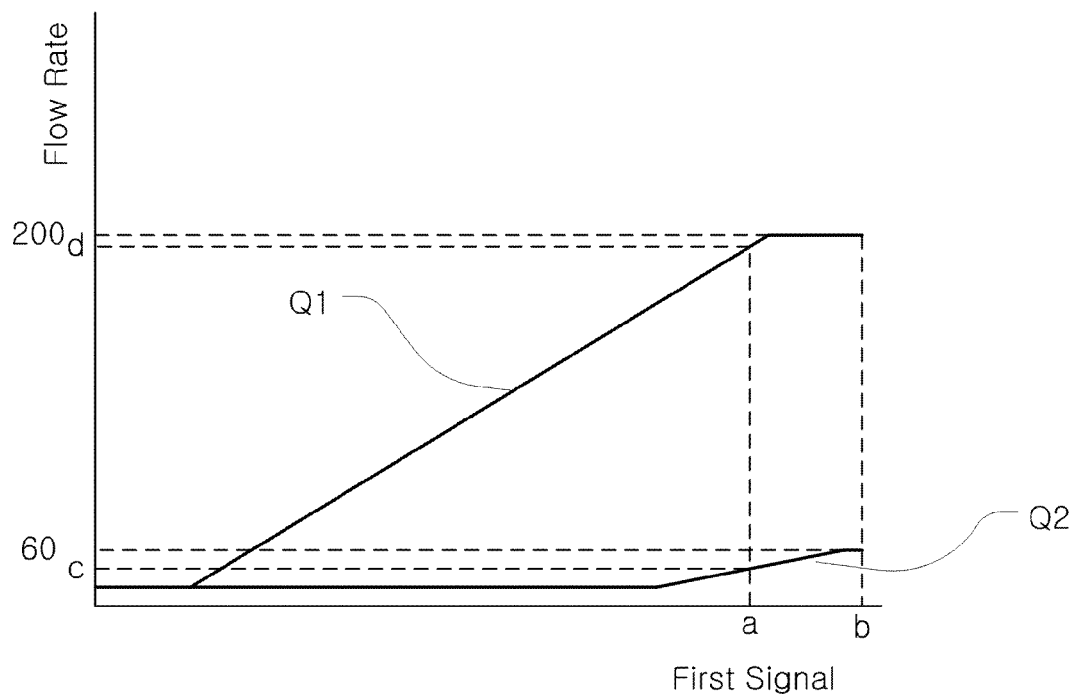
[Fig. 4]

[Fig. 5]
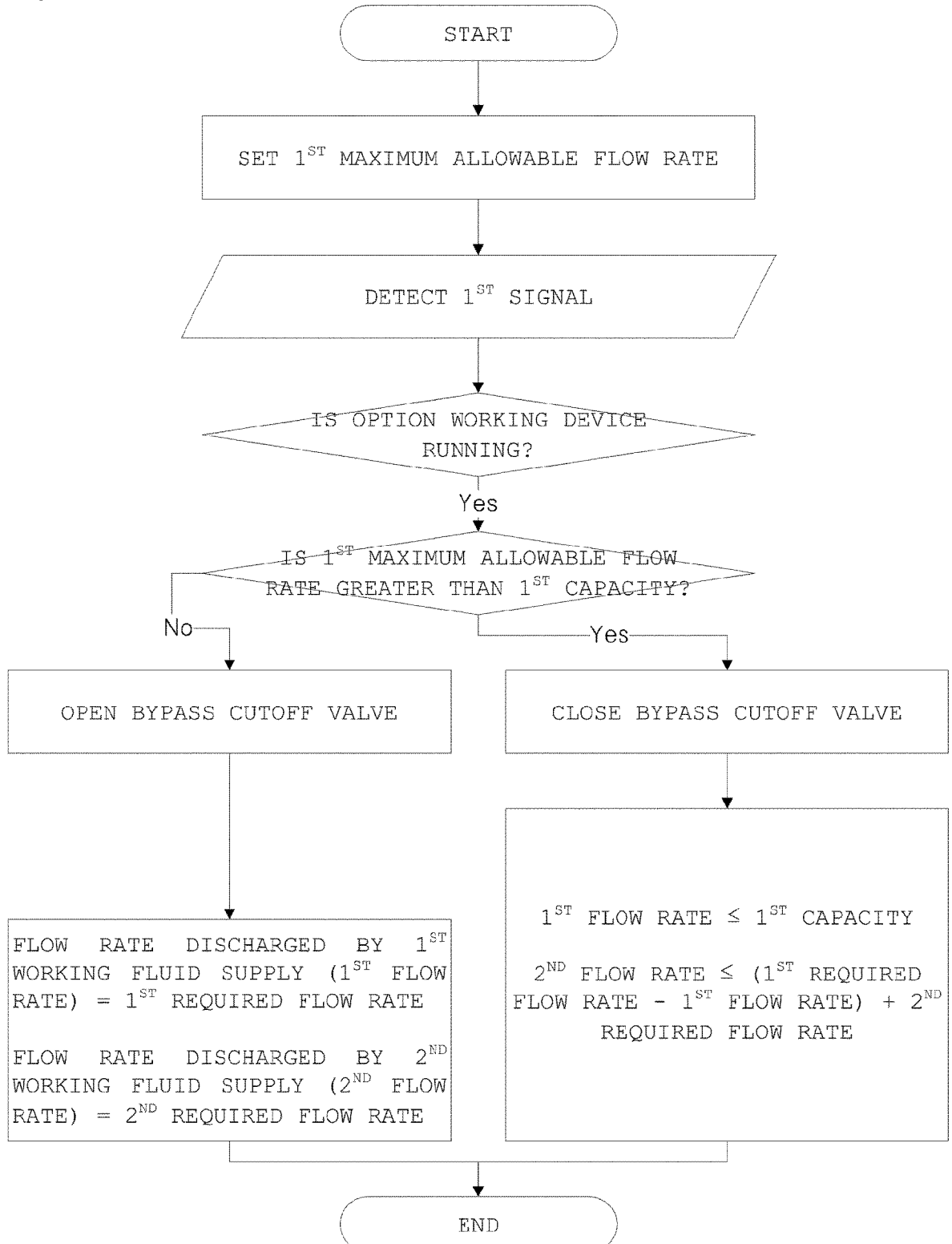

[Fig. 6]
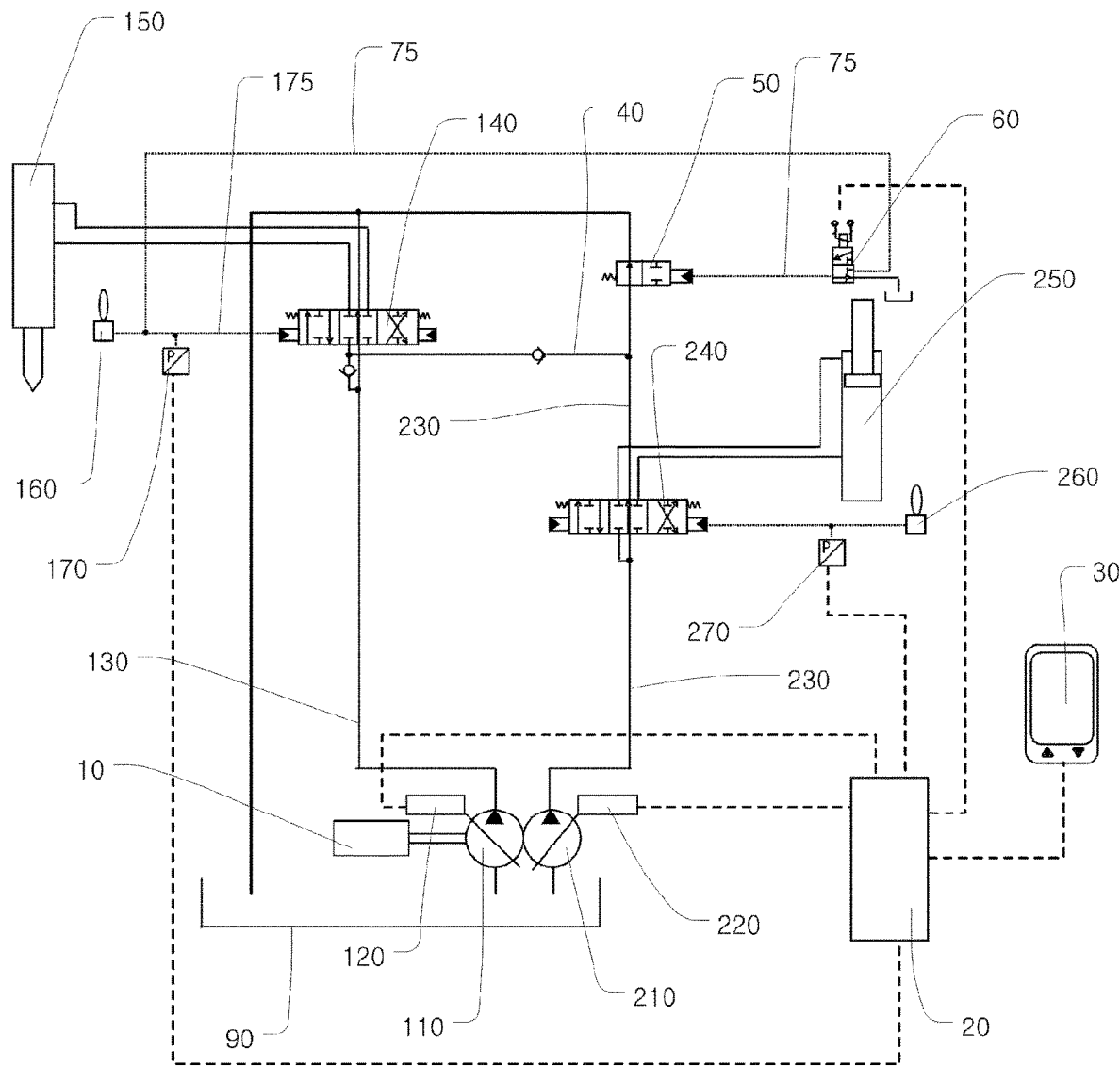

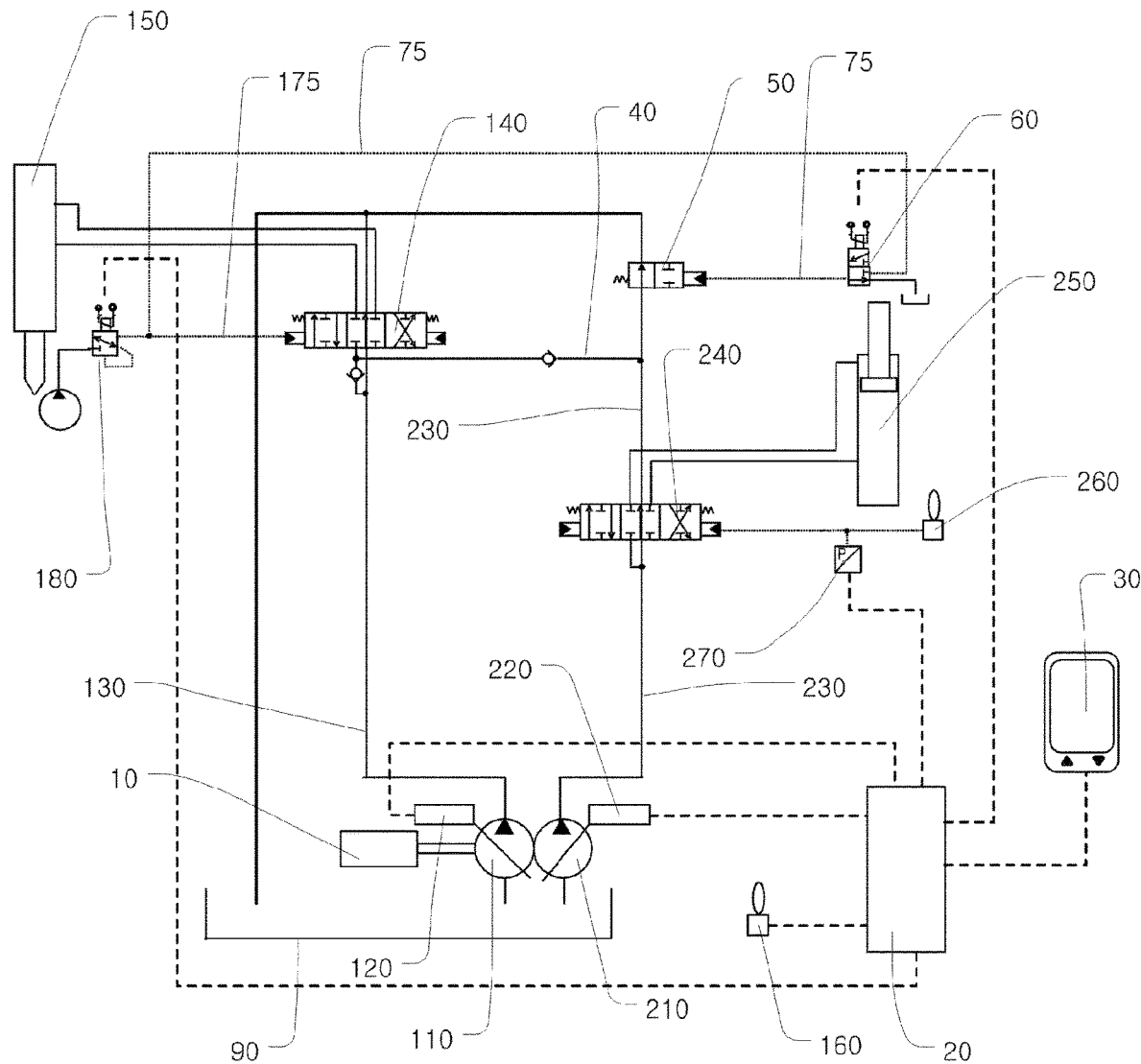
[Fig. 7]

[Fig. 8]
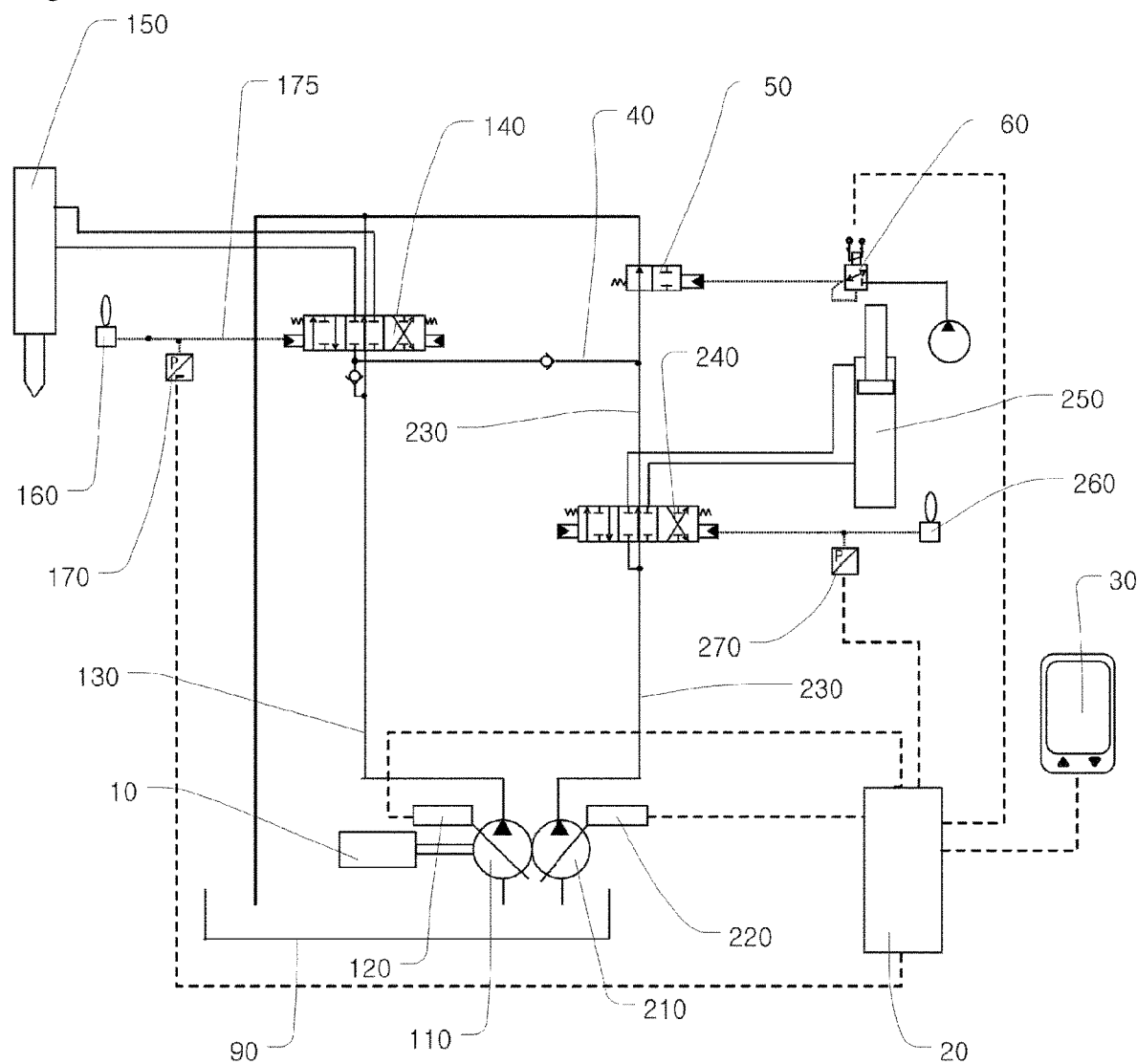

[Fig. 9]
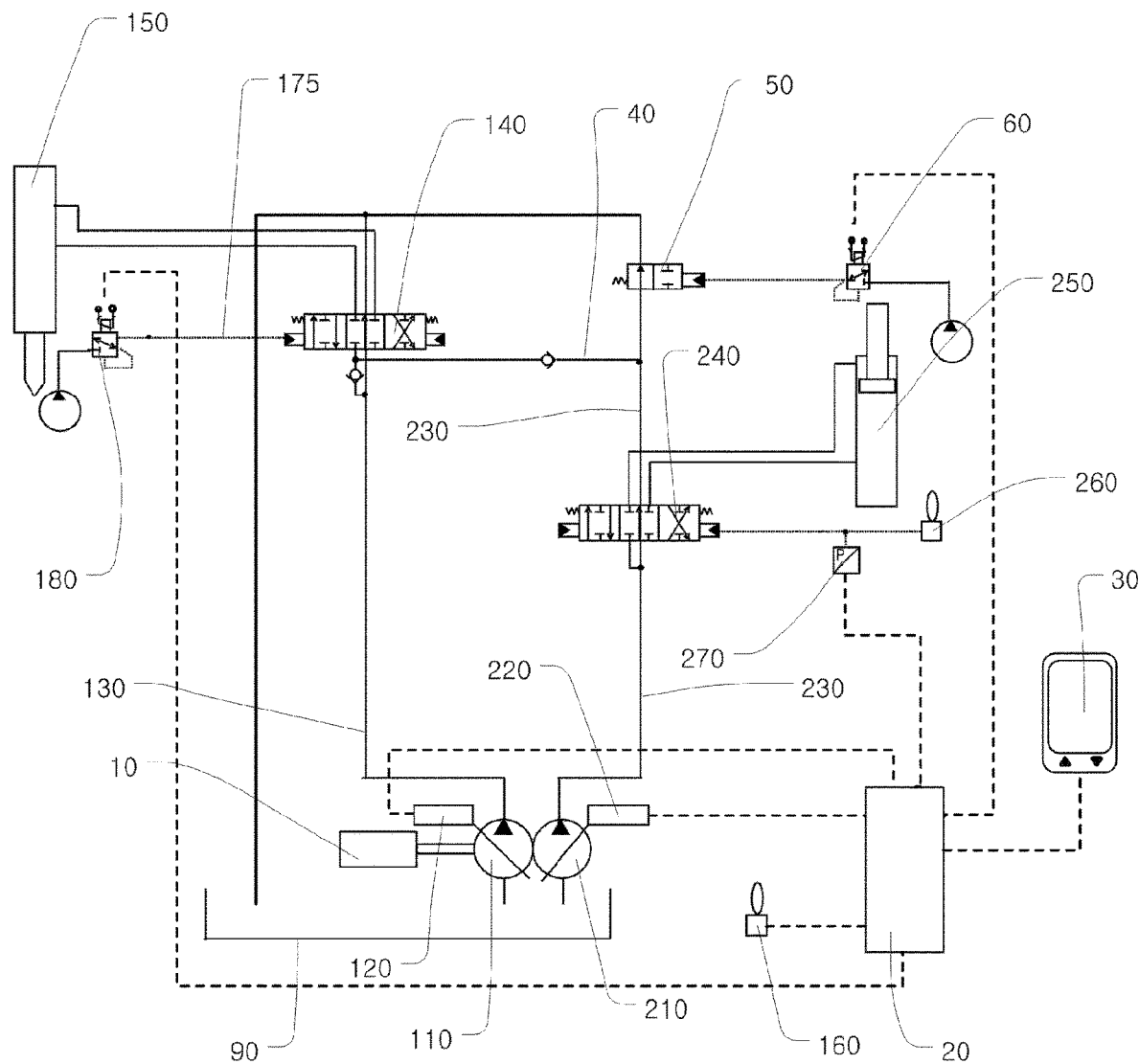

[Fig. 10]
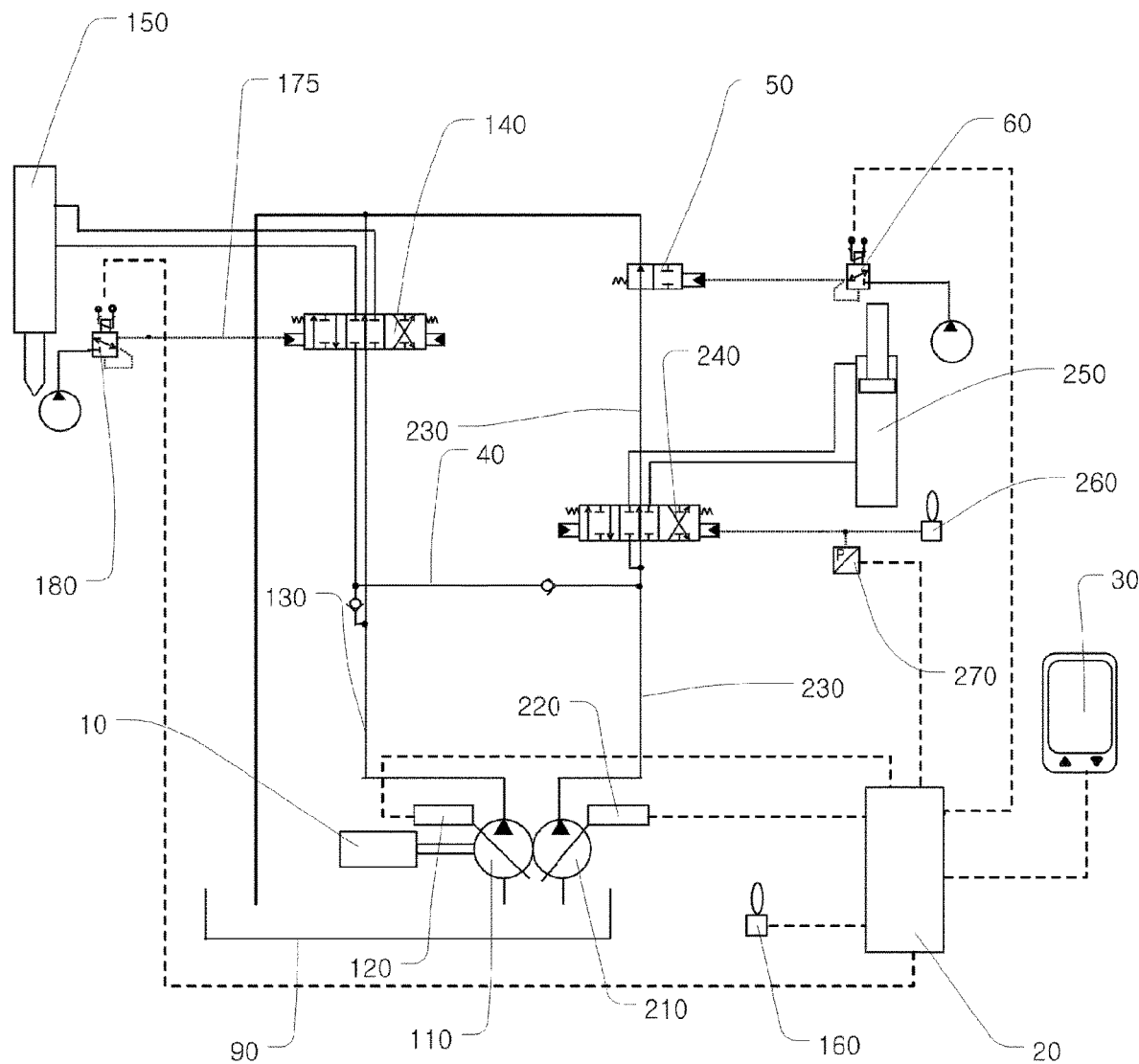

【Figure 11】
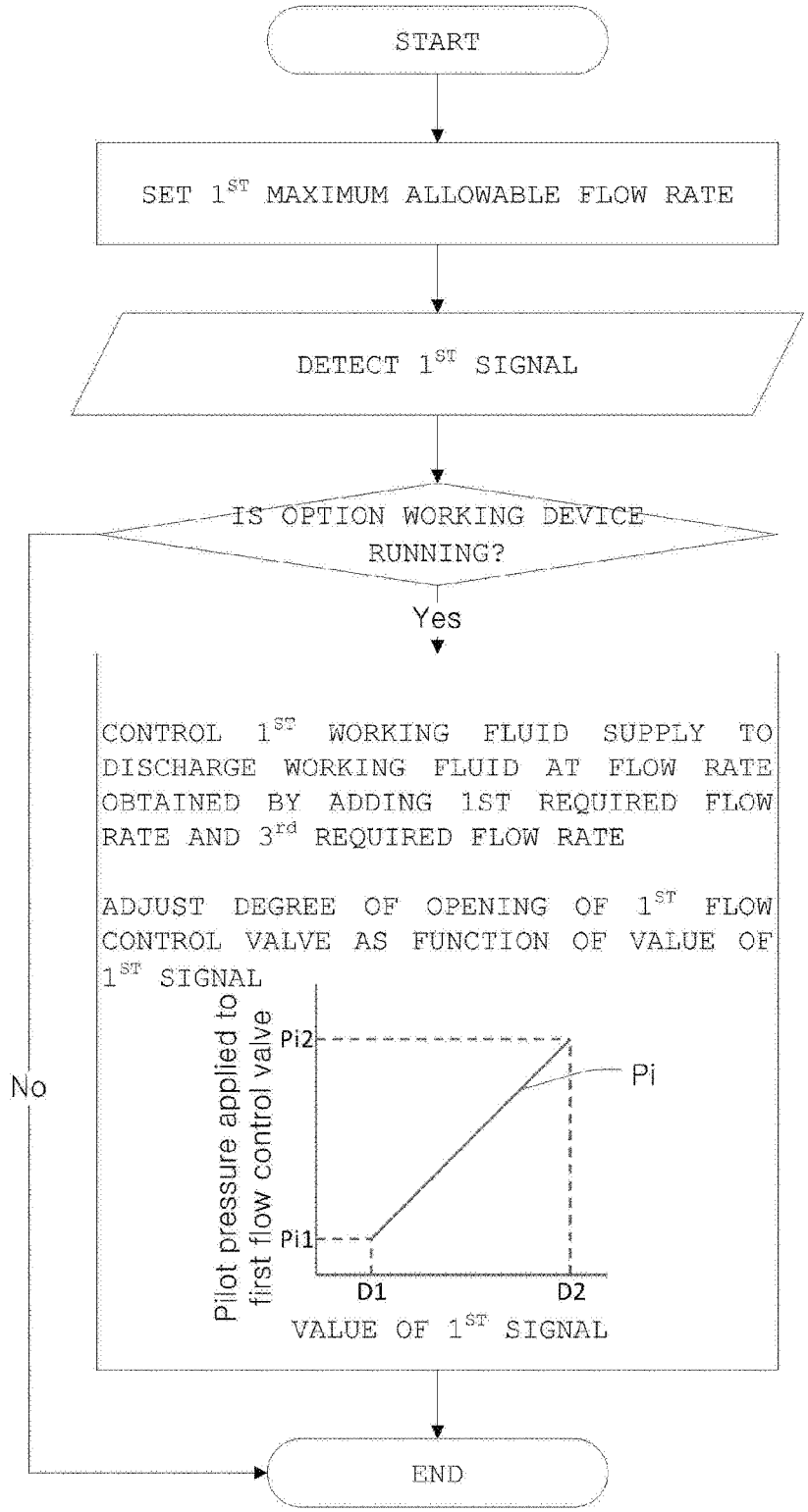

[Figure 12]
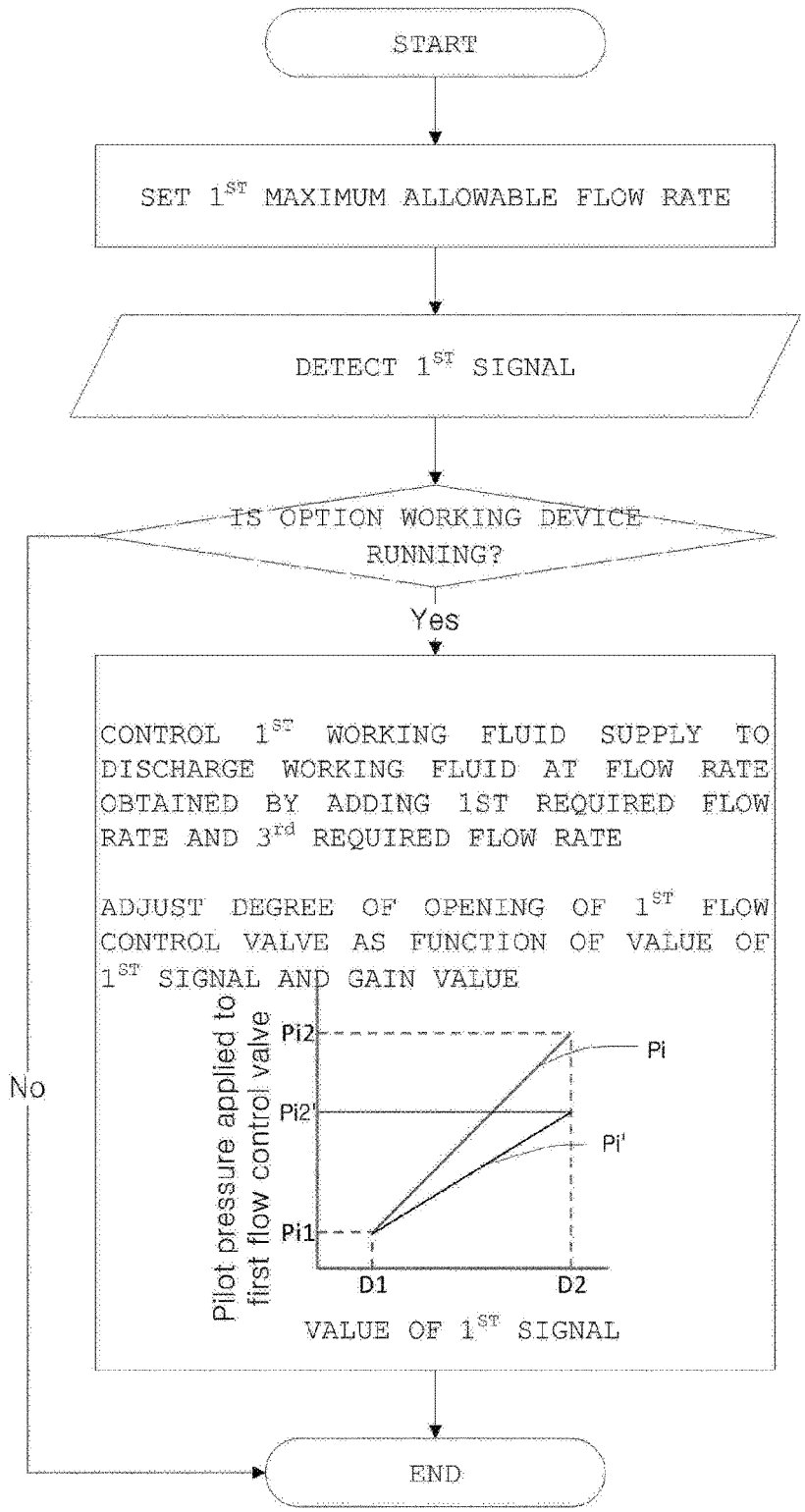

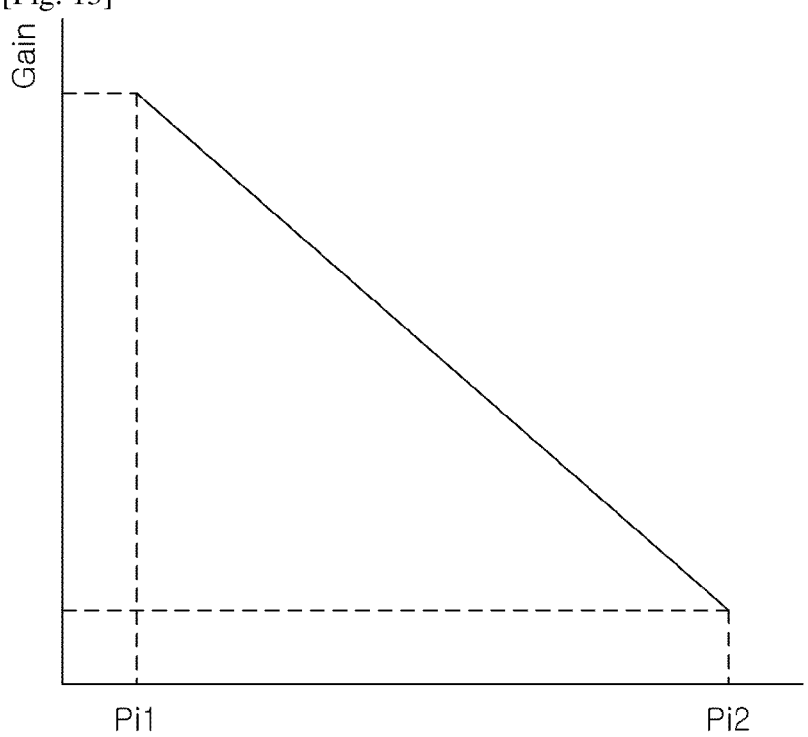
[Fig. 13]

[Fig. 14]
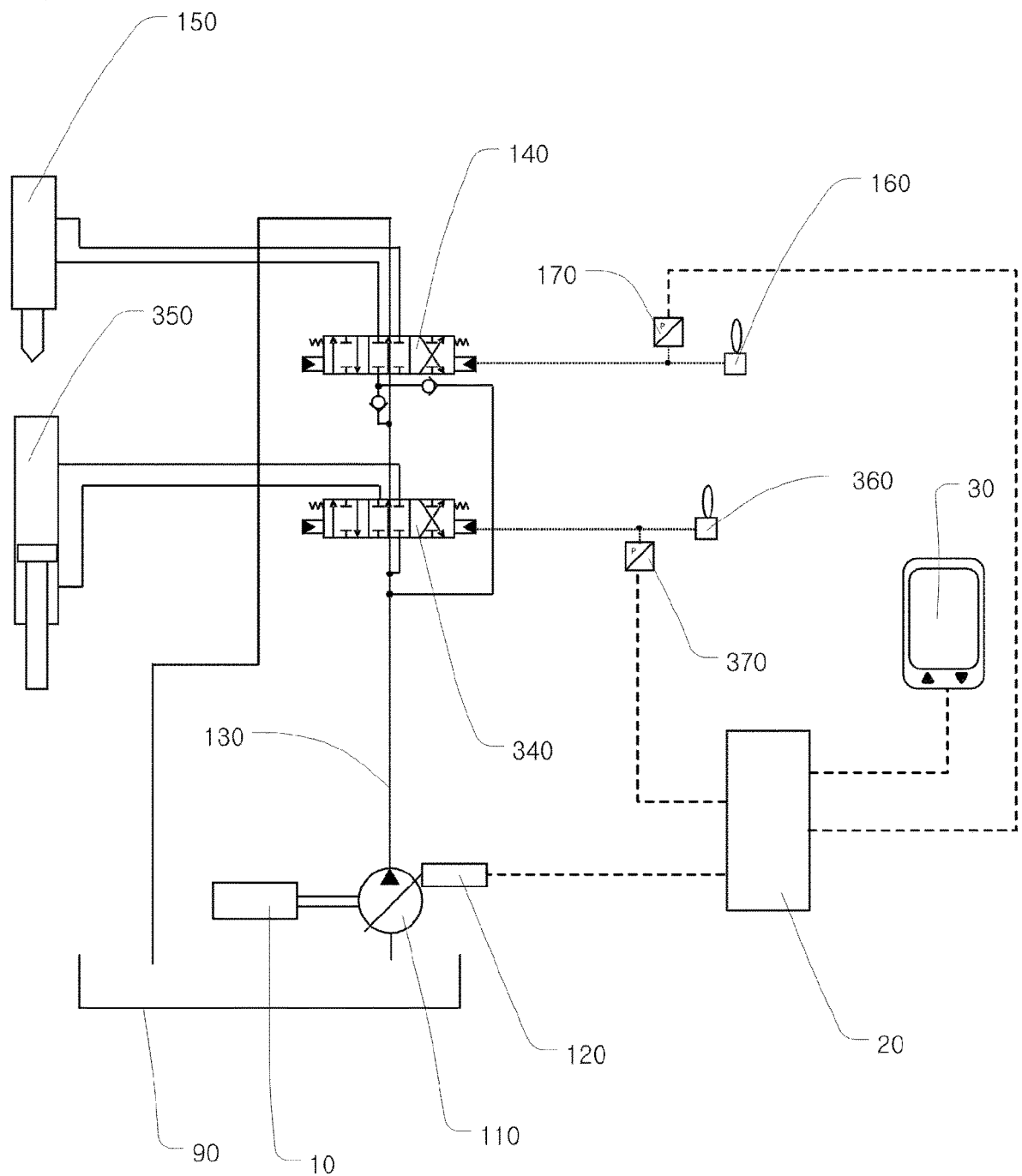

[Fig. 15]
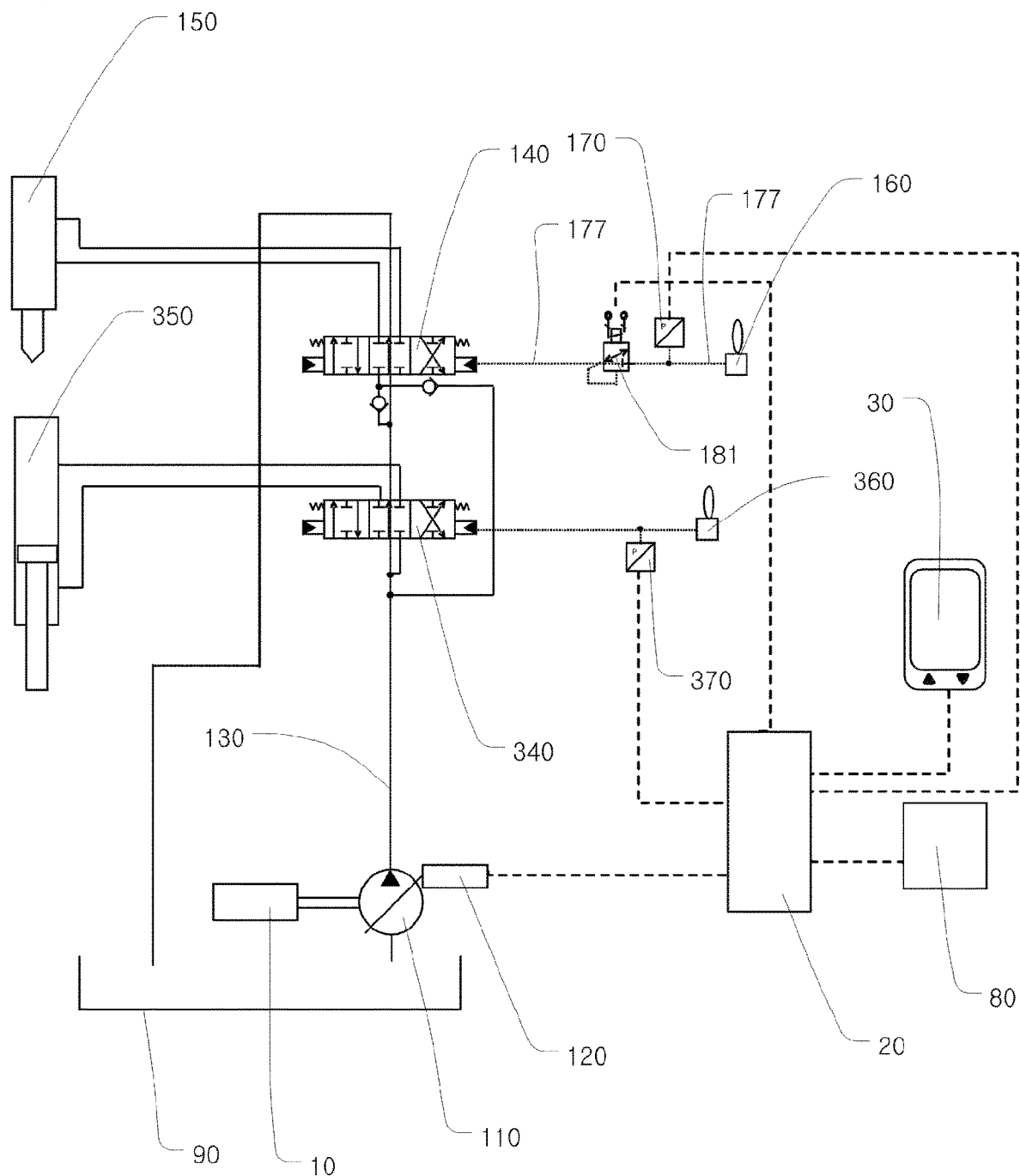

[Fig. 16]
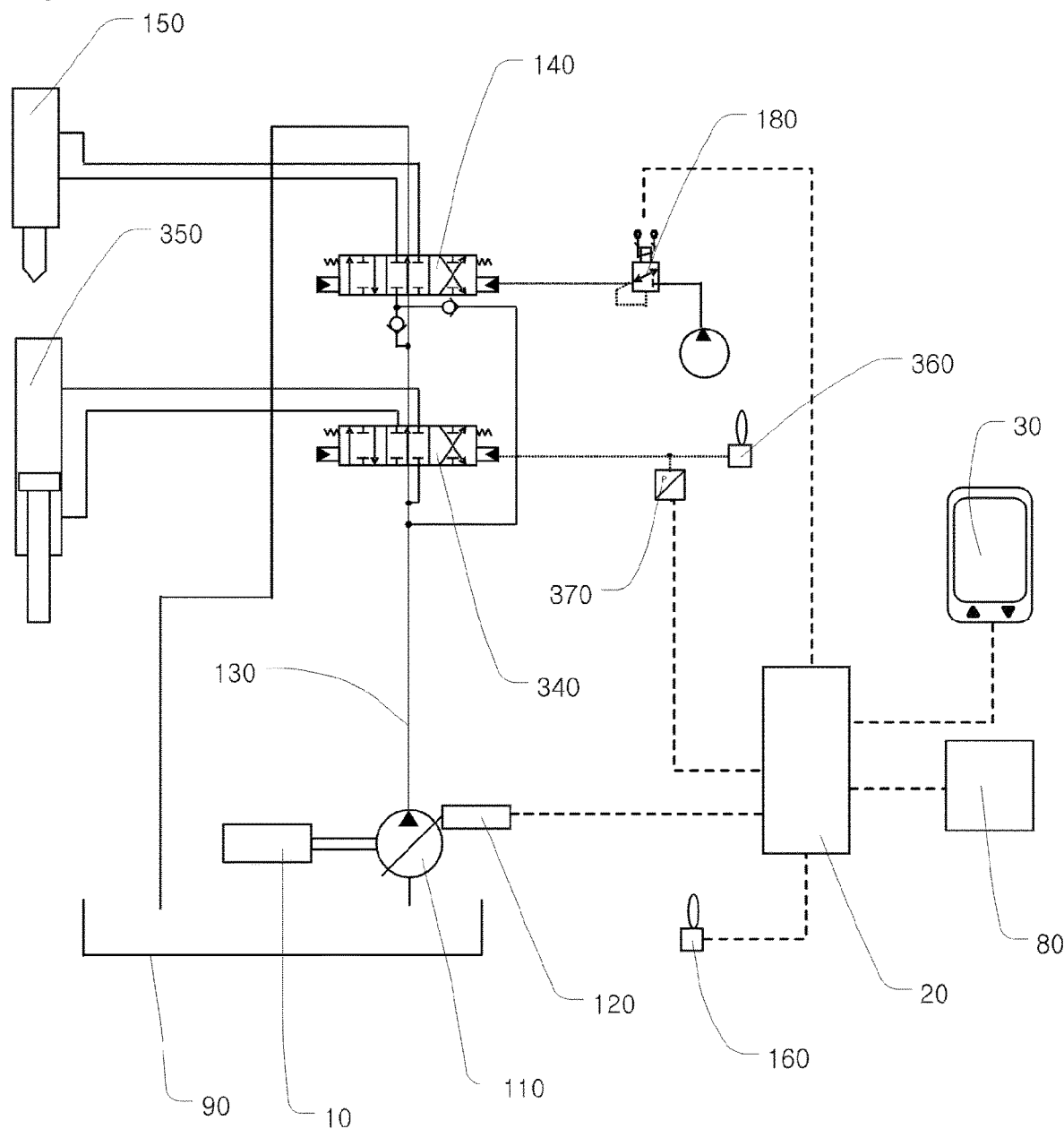

HYDRAULIC MACHINE

CROSS REFERENCE TO RELATED APPLICATIONS

This application is a 35 U.S.C. § 371 national stage application of PCT International Application No. PCT/KR2017/014777 filed on Dec. 14, 2017, the disclosure and content of which is incorporated by reference herein in its entirety.

TECHNICAL FIELD

The present disclosure relates to a hydraulic machine, and more particularly, to a hydraulic machine with which excellent workability can be obtained while damage to an option actuator can be minimized.

BACKGROUND ART

A variety of hydraulic machines obtaining power through the supply of pressurized fluid are used in construction sites, industrial sites, and the like. For example, in such a hydraulic machine, a pressurized fluid supply feeds pressurized fluid to respective actuators, and working devices connected to the respective actuators perform work using the pressure and the flow rate of the pressurized fluid. Such a hydraulic machine is designed such that working fluid is supplied to respective actuators at an optimum flow rate.

However, specific working devices, referred to as option working devices, require a variety of flow rates depending on the type thereof. A first type of working device may require a flow rate lower than the capacity of a working fluid supply, a second type of working device may require a flow rate the same as the capacity of a working fluid supply, and a third type of working device may require a flow rate higher than the capacity of a working fluid supply. When an option working device requires a flow rate higher than the capacity of a working fluid supply corresponding thereto, a hydraulic machine provides an option actuator with working fluid at a flow rate obtained by combining flows of working fluid discharged by a plurality of working fluid supplies. In this case, when working fluid is supplied to the option actuator, in particular, a motor, at an excessive flow rate, the option actuator may be damaged. It is therefore necessary to control the supply of working fluid to the option actuator such that the flow rate of working fluid is not higher than the maximum allowable flow rate of the option actuator.

FIG. 1 is a flowchart schematically illustrating a flow rate control algorithm performed in a hydraulic machine of the related art.

Referring to FIG. 1 (together with FIG. 6), specific hydraulic machines of the related art control working fluid supplies, i.e. a first working fluid supply and a second working fluid supply, such that a maximum flow rate of working fluid discharged thereby is not higher than a maximum flow rate of working fluid allowed to be supplied to an option actuator (hereinafter, referred to as a "first maximum allowable flow rate), to prevent the option working device from being damaged. For example, in the case in which the first maximum allowable flow rate is set to be 260 lpm and the maximum flow rate of working fluid dischargeable by the first working fluid supply (hereinafter, referred to as "first capacity") and the maximum flow rate of working fluid dischargeable by the second working fluid supply (hereinafter, referred to as "second capacity") are 200 lpm, when a first flow rate that the working fluid supplies are required to discharge in response to the manipulation of a first manipulator is 260 lpm, the second working fluid supply is controlled to discharge working fluid at a flow rate of 200 lpm, and the first working fluid supply is controlled to discharge working fluid at a flow rate of 60 lpm (=260 lpm−200 lpm). The problem of such a system occurs when the first manipulator and a second manipulator are simultaneously manipulated to perform a combined operation. Operating the second working device causes the second flow control valve to move to cut off the second fluid path, thereby preventing confluence. Consequently, working fluid discharged by the second fluid supply cannot reach the first flow control valve. Since the option actuator is only supplied with working fluid discharged by the first working fluid supply, the speed of the option working device is significantly reduced, leading to significantly lowered workability. For example, even in the case in which the option actuator requires working fluid at a flow rate of 260 lpm in the above-described example, working fluid may only be supplied at a flow rate of 60 lpm by the first working fluid supply, thereby significantly lowering the workability of the option working device.

FIG. 2 is a flowchart schematically illustrating a flow rate control algorithm performed in another hydraulic machine of the related art.

Referring to FIG. 2 (together with FIG. 14), in specific hydraulic machines of the related art, the first working fluid supply is controlled to discharge working fluid at a flow rate equal to or lower than a first maximum allowable flow rate to prevent an option actuator from being damaged. For example, when the first maximum allowable flow rate is set to be 80 lpm and the first capacity is set to be 200 lpm, the flow rate of working fluid dischargeable by the first working fluid supply is limited to 80 lpm, even in the case in which the first manipulator and the third manipulator are simultaneously manipulated for a combined operation. Thus, working fluid may be supplied to the option working device and the third working device at significantly insufficient flow rates, so that the speeds of the option working device and the third working device are reduced, thereby lowering workability, which is problematic.

DISCLOSURE OF INVENTION

Technical Problem

Accordingly, the present disclosure has been made in consideration of the above-described problems occurring in the related art, and the present disclosure proposes a hydraulic machine that can obtain excellent workability while minimizing damage to an option actuator.

Solution to Problem

According to an aspect of the present disclosure, a hydraulic machine may include: a first working fluid supply, with a maximum flow rate dischargeable therefrom being equal to a first capacity; a second working fluid supply; a first working fluid path extending from the first working fluid supply; a second working fluid path extending from the second working fluid supply; a confluence path connecting the first working fluid path and the second working fluid path to selectively allow working fluid from the second working fluid path to be combined with working fluid in the first working fluid path; a first flow control valve located on the first working fluid path to be movable from a first position to a second position to direct working fluid from the first working fluid path to a first actuator; a second flow control valve located on the second working fluid path to be movable from a first position to a second position to direct working fluid from the second working fluid path to a second actuator; a first manipulator generating a first signal to adjust a displacement of the first flow control valve; a second manipulator generating a second signal to adjust a displacement of the second flow control valve; and a controller. The first actuator includes an option actuator, with a maximum flow rate allowed to be supplied thereto being preset to be a first maximum allowable flow rate. The controller controls the first working fluid supply and the second working fluid supply such that the first working fluid supply discharges working fluid at a flow rate equal to the first capacity and the second working fluid supply discharges working fluid at a flow rate obtained by deducing the first capacity from the first maximum allowable flow rate when the first maximum allowable flow rate is higher than the first capacity, a value of the first signal is a maximum level, and a value of the second signal is equal to or higher than a minimum level and equal to or lower than a maximum level.

According to another aspect of the present disclosure, a hydraulic machine may include: a first working fluid supply, with a maximum flow rate dischargeable therefrom being equal to a first capacity; a second working fluid supply, with a maximum flow rate dischargeable therefrom being equal to a second capacity; a first working fluid path extending from the first working fluid supply; a second working fluid path extending from the second working fluid supply; a confluence path connecting the first working fluid path and the second working fluid path to selectively allow working fluid from the second working fluid path to be combined with working fluid in the first working fluid path; a first flow control valve located on the first working fluid path to be movable from a first position to a second position to direct working fluid from the first working fluid path to a first actuator; a second flow control valve located on the second working fluid path to be movable from a first position to a second position to direct working fluid from the second working fluid path to a second actuator; a first manipulator generating a first signal to adjust a displacement of the first flow control valve; a second manipulator generating a second signal to adjust a displacement of the second flow control valve; and a controller. The first actuator includes an option actuator, with a maximum flow rate allowed to be supplied thereto being preset to be a first maximum allowable flow rate. The controller calculates a first required flow rate as a function of the first maximum allowable flow rate and a value of the first signal, calculates a second required flow rate as a function of a value of the second signal, and controls the first working fluid supply and the second working fluid supply such that the first working fluid supply discharges working fluid at a flow rate equal to the first capacity and the second working fluid supply discharges working fluid at a flow rate obtained by deducing the first capacity from the first maximum allowable flow rate, added to the second required flow rate, when the first maximum allowable flow rate is higher than the first capacity, the value of the first signal is a maximum level, and the value of the second signal is equal to or higher than a minimum level and equal to or lower than a maximum level.

According to another aspect of the present disclosure, a hydraulic machine may include: a first working fluid supply; a first flow control valve adjusting a flow of working fluid directed from the first working fluid supply to a first actuator; a third flow control valve adjusting a flow of working fluid directed from the first working fluid supply to a third actuator; a first manipulator generating a first signal to adjust a degree of opening of the first flow control valve; a third manipulator generating a third signal to adjust a degree of opening of the third flow control valve; and a controller. The first actuator includes an option actuator, with a maximum flow rate allowed to be supplied thereto being preset to be a first maximum allowable flow rate. The controller calculates a first required flow rate as a function of the first maximum allowable flow rate and a value of the first signal and controls the first working fluid supply to discharge working fluid at a flow rate obtained by adding the first required flow rate and a third required flow rate.

BRIEF DESCRIPTION OF DRAWINGS

FIG. 1 is a flowchart schematically illustrating a flow rate control algorithm performed in a hydraulic machine of the related art;

FIG. 2 is a flowchart schematically illustrating a flow rate control algorithm performed in another hydraulic machine of the related art;

FIG. 3 is a flowchart schematically illustrating a flow rate control algorithm performed in a hydraulic machine according to exemplary embodiments;

FIG. 4 is a graph illustrating an exemplary relationship between a flow rate of fluid discharged by a first working fluid supply and a flow rate of fluid discharged by a second working fluid supply in response to a first signal generated by a first manipulator;

FIG. 5 is a flowchart schematically illustrating a flow rate control algorithm performed in the hydraulic machine according to exemplary embodiments;

FIG. 6 is a diagram schematically illustrating a configuration of the hydraulic machine according to exemplary embodiments;

FIG. 7 is a diagram schematically illustrating a configuration of the hydraulic machine according to exemplary embodiments;

FIG. 8 is a diagram schematically illustrating a configuration of the hydraulic machine according to exemplary embodiments;

FIG. 9 is a diagram schematically illustrating a configuration of the hydraulic machine according to exemplary embodiments;

FIG. 10 is a diagram schematically illustrating a configuration of the hydraulic machine according to exemplary embodiments;

FIG. 11 is a flowchart schematically illustrating a flow rate control algorithm performed in the hydraulic machine according to exemplary embodiments;

FIG. 12 is a flowchart schematically illustrating a flow rate control algorithm performed in the hydraulic machine according to exemplary embodiments;

FIG. 13 is a graph illustrating an exemplary relationship between a third signal of a third manipulator and a gain value;

FIG. 14 is a diagram schematically illustrating a configuration of the hydraulic machine according to exemplary embodiment;

FIG. 15 is a diagram schematically illustrating a configuration of the hydraulic machine according to exemplary embodiments; and FIG. 16 is a diagram schematically illustrating a configuration of the hydraulic machine according to exemplary embodiments.

MODE FOR THE INVENTION

Hereinafter, exemplary embodiments of the present disclosure will be described in detail with reference to the accompanying drawings.

Hydraulic machines presented in the present disclosure may be machines used in a variety of fields to perform work using hydraulic pressure. For example, hydraulic machines presented in the present disclosure may be construction machines, industrial machines, or the like. In particular, hydraulic machines presented in the present disclosure may be employed in construction machines, such as excavators.

FIG. 3 is a flowchart schematically illustrating a flow rate control algorithm performed in a hydraulic machine according to exemplary embodiments.

Referring to FIG. 3 together with FIGS. 6 to 10, a hydraulic machine may include a first working fluid supply 110, a second working fluid supply 210, a first actuator 150, and a second actuator 250. The hydraulic machine may include a first flow control valve 140, a second flow control valve 240, a first manipulator 160, a second manipulator 260, and a controller 20. The hydraulic machine may include a first working fluid path 130 and a second working fluid path 230. The hydraulic machine may include a confluence path 40. The hydraulic machine may include a bypass cutoff valve 50. Although the bypass cutoff valve 50 may include a spool, as as illustrated in FIGS. 6 to 10, the bypass cutoff valve 50 may include a poppet. In addition, although any valve other than the bypass cutoff valve 50 is described and illustrated as including a spool in the specification and the drawings, it should be understood that this is merely illustrative. For example, although the first and second flow control valves 140 and 240 are illustrated as including spools, respectively, it is to be understood that poppets may be provided in place of the spools. In addition, although the drawings illustrate embodiments in which respective valves (or sub-valves) are integrated into the first flow control valve 140 (the first working fluid supply 110 → a valve opening and closing a flow of working fluid to one side of the first actuator 150, the other side of the first actuator 150 → a valve opening and closing a flow of working fluid to a tank 90, the first working fluid supply 110 → a valve opening and closing a flow of working fluid to the other side of the first actuator 150, and one side of the first actuator 150 → a valve opening and closing a flow of working fluid to the tank 90), it should also be understood that these embodiments are merely illustrative. For example, these valves (or sub-valves) may be disposed independently of each other (independent metering valves). The hydraulic machine may include a control valve 60. The hydraulic machine may include a first input device 30. The hydraulic machine may include a prime mover 10 and regulators 120 and 220. The hydraulic machine may include a first pressure sensor 170 and a second pressure sensor 270. The hydraulic machine may include the tank 90.

The first working fluid supply 110 may send fluid from the tank 90 to the first actuator 150. The first working fluid supply 110 may be a hydraulic pump.

The second working fluid supply 210 may send fluid from the tank 90 to the second actuator 250. The second working fluid supply 210 may be a hydraulic pump.

The first actuator 150 may be an option actuator driving an option working device (e.g. a hammer, a crusher, or the like). A maximum flow rate of working fluid allowed to be supplied to the first actuator 150 (i.e. a first maximum allowable flow rate) may be preset. In this regard, the hydraulic machine may include the first input device 30 with which an operator sets the first maximum allowable flow rate. Additionally or alternatively, the hydraulic machine may automatically detect an option working device and automatically set a first maximum allowable flow rate corresponding to the detected option working device.

The second actuator 250 may be an actuator driving a working device, for example, a boom, an arm, a bucket, or the like.

The first working fluid path 130 may extend from the first working fluid supply 110. Working fluid discharged by the first working fluid supply 110 may be sent to the first flow control valve 140 along the first working fluid path 130.

The second working fluid path 230 may extend from the second working fluid supply 210. Working fluid discharged by the second working fluid supply 210 may be sent to the second flow control valve 240 along the second working fluid path 230.

The confluence path 40 may connect the first working fluid path 130 and the second working fluid path 230. The confluence path 40 may selectively allow working fluid flowing through the second working fluid path 230 to be combined with working fluid flowing through the first working fluid path 130. For the hydraulic machine to allow such a combined flow of fluid, i.e. a confluence, the first maximum allowable flow rate is required to be higher than a maximum flow rate of working fluid that the first working fluid supply 110 can supply (i.e. a first capacity). The confluence path 40 may be connected to the second working fluid path 230, in a location upstream of the bypass cutoff valve 50 as will be described later. The confluence path 40 may be connected to (a path parallel to) the first working fluid path 130, in a location upstream of the first flow control valve 140. As illustrated in FIG. 6, a check valve may be located on the confluence path 40.

The first flow control valve 140 may be located on the first working fluid path 130. The first flow control valve 140 may have a first position and a second position. The first position may be a neutral position, while the second position may be a non-neutral position. The first flow control valve 140 may move from the first position, the neutral position, to the second position, the non-neutral position, in response to, for example, working pressure being applied thereto. When the first flow control valve 140 is in the neutral position, working fluid flowing from the first working fluid supply 110 may return to the tank 90 instead of being supplied to the option actuator 150. The second position may include a third position and a fourth position. The direction in which working fluid flows between the option actuator 150 and the first flow control valve 140 when the first flow control valve 140 is in the third position may be opposite to the direction in which working fluid flows between the option actuator 150 and the first flow control valve 140 when the first flow control valve 140 is in the fourth position.

The second flow control valve 240 may be located on the second working fluid path 230. Likewise, the second flow control valve 240 may include a first position and a second position. The first position may be a neutral position, while the second position may be a non-neutral position. The second flow control valve 240 may move from the first position, the neutral position, to the second position, the non-neutral position, in response to, for example, a working pressure being applied thereto. When the second flow control valve 240 is in the neutral position, working fluid flowing from the second working fluid supply 210 may return to the tank 90 instead of being supplied to the second actuator 250. The second position may include a third position and a fourth position. The direction in which working fluid flows between the second actuator 250 and the second flow control valve 240 when the second flow control valve 240 is in the third position may be opposite to the direction in which working fluid flows between the second actuator 250 and the second flow control valve 240 when the second flow control valve 240 is in the fourth position.

The first manipulator 160 may generate a first signal to adjust a displacement of the first flow control valve 140.

The second manipulator 260 may generate a second signal to adjust a displacement of the second flow control valve 240. As illustrated in FIGS. 6 to 10, the second signal may be a hydraulic signal. The second manipulator 260 may include a manipulation portion, such as a lever or a pedal, and a pressure-reducing valve (not shown). In response to the manipulation portion being manipulated, the pressure-reducing valve may be moved and may generate a hydraulic signal depending on the displacement of the pressure-reducing valve. The hydraulic signal may be applied to the second flow control valve 240 to move the second flow control valve 240. Alternatively, the second signal may be an electrical signal. The second manipulator 260 may include a manipulation portion, such as a lever, a pedal, or a wheel, and an electrical signal generator (not shown). The electrical signal generator may generate an electrical signal in response to the manipulation portion being manipulated. The electrical signal may be transmitted to the controller 20, which in turn may transmit a corresponding electrical signal to an electro-proportional pressure-reducing valve (not shown), such that the electro-proportional pressure-reducing valve applies a corresponding pilot pressure to the second flow control valve 240.

The controller 20 may include an electronic control unit (ECU). The ECU may include a central processing unit (CPU), a memory, and the like. The controller 20 may calculate a first required flow rate as a function of the first maximum allowable flow rate and a value of the first signal and a second required flow rate as a function of the second signal. As discussed above, the first maximum allowable flow rate is variable, changing depending on settings, and the first required flow rate is a function of both the value of the first signal and the first maximum allowable flow rate. In contrast, a maximum flow rate allowed to be supplied to the second actuator 250 may be a constant, and the second required flow rate may be a function only related to a value of the second signal.

The hydraulic machine may include the bypass cutoff valve 50. The bypass cutoff valve 50 may be located on the second working fluid path 230, downstream of a location in which the second flow control valve 240 is located and a location in which the confluence path 40 is connected, to open and cut off the second working fluid path 230. To allow confluence, the bypass cutoff valve 50 may cut off at least a portion of the second working fluid path 230. When at least a portion of the bypass cutoff valve 50 is cut off, at least a portion of working fluid flowing through the second working fluid path 230 after having passed through the second flow control valve 240 may flow to the first flow control valve 140 through the confluence path 40 instead of continuing to flow to the tank 90. The bypass cutoff valve 50 may adjust a degree to which the second working fluid path 230 is cut off, as a function of the value of the first signal.

The control valve 60 may be connected to the bypass cutoff valve 50 and operate the bypass cutoff valve 50 by applying a pilot pressure to the bypass cutoff valve 50. The controller 20 may close the control valve 60 when the first maximum allowable flow rate is equal to or less than the maximum flow rate of working fluid that the first working fluid supply may discharge (i.e. a first capacity). (Hereinafter, closing the control valve 60 means moving the control valve 60 to a closed position in which a second pilot fluid path 75 is closed.) In contrast, when the first maximum allowable flow rate is higher than the first capacity, the controller 20 may open the control valve 60. (Hereinafter, opening the control valve 60 means moving the control valve 60 to an open position in which a second pilot fluid path 75 is opened.)

The hydraulic machine may include the prime mover 10 and the regulators 120 and 220. The prime mover 10 may drive the first working fluid supply 110 and the second working fluid supply 210. The first working fluid supply 110 and the second working fluid supply 210 may adjust flow rates of fluid discharged by the first working fluid supply 110 and the second working fluid supply 210 using the regulators 120 and 220 that control the capacities of the working fluid supplies. The hydraulic machine may include an electro-proportional pressure-reducing valve (not shown). The controller 20 may operate the electro-proportional pressure-reducing valve by applying an electrical signal to the electro-proportional pressure-reducing valve. The electro-proportional pressure-reducing valve may operate the regulators 120 and 220 by applying an amount pilot pressure, corresponding to the electrical signal, to the regulators 120 and 220.

Hereinafter, the flow rate control algorithm will be sequentially described with reference to FIG. 3.

First, a user sets a first maximum allowable flow rate using the first input device 30 or the hydraulic machine automatically sets the first maximum allowable flow rate by recognizing the option working device.

When a first signal from the first manipulator 160 is detected, it is determined whether or not the previously-set first maximum allowable flow rate is higher than a first capacity.

When the first maximum allowable flow rate is not determined to be higher than the first capacity, the bypass cutoff valve 50 is opened (or is maintained in an open state), the first working fluid supply 110 is controlled to discharge working fluid at a first required flow rate that the first working fluid supply 110 is requested from the first manipulator 160, and the second working fluid supply 210 is controlled to discharge fluid at a second flow rate that the second working fluid supply 210 is requested from the second manipulator 260.

In contrast, when the first maximum allowable flow rate is determined to be higher than the first capacity, the bypass cutoff valve 50 may be closed, the first working fluid supply 110 may be controlled to discharge fluid at a first flow rate equal to or lower than the first capacity, and the second working fluid supply 210 may be controlled to discharge fluid at a second flow rate equal to or lower than a value obtained by deducing the first capacity from the first maximum allowable flow rate.

When the first maximum allowable flow rate is higher than the first capacity, the value of the first signal is a maximum level, and the value of the second signal is equal to or higher than a minimum level and equal to or lower than a maximum level, the first working fluid supply may be controlled to discharge fluid at a flow rate equal to the first capacity, and the second working fluid supply may be controlled to discharge fluid at a flow rate obtained by deducing the first capacity from the first maximum allowable flow rate.

FIG. 4 is a graph illustrating an exemplary relationship between a first signal generated by the first manipulator and flow rates of fluid discharged by the first working fluid supply and the second working fluid supply when the first maximum allowable flow rate is higher than the first capacity.

Q1 indicates a flow rate of working fluid discharged by the first working fluid supply in response to the first signal, while Q2 indicates a flow rate of working fluid discharged by the second working fluid supply in response to the first signal. (Q2 differs from a second flow rate of working fluid discharged by the second working fluid supply in response to the first signal and a second signal.)

For example, when the first maximum allowable flow rate is 260 lpm and the first capacity is 200 lpm, manipulating the first manipulator alone (e.g. first signal=a<b) may cause the first working fluid supply 110 to discharge working fluid at a flow rate d, lower than the first capacity, and the second working fluid supply 210 to discharge working fluid at a flow rate c, lower than a value obtained by deducing the first capacity from the first maximum allowable flow rate (=60 lpm).

For example, when the first maximum allowable flow rate is 260 lpm and the first capacity is 200 lpm, simultaneously manipulating the first manipulator (e.g. first signal=a) and the second manipulator may cause the first working fluid supply 110 to discharge working fluid at the flow rate d, lower than the first capacity, and the second working fluid supply 210 to discharge working fluid at a flow rate higher than the flow rate c and equal to or lower than a value obtained by deducing the first capacity from the first maximum allowable flow rate (=60 lpm), depending on a second required flow rate.

For example, when the first maximum allowable flow rate is 260 lpm and the first capacity is 200 lpm, manipulating the first manipulator to a maximum displacement such that the first required flow rate is substantially the same as the first maximum allowable flow rate (first signal=b) may cause the first working fluid supply 110 to discharge working fluid at a flow rate corresponding to the first capacity (=200 lpm), and the second working fluid supply 210 to discharge working fluid at a flow rate corresponding to a value obtained by deducing the first capacity from the first maximum allowable flow rate (=260 lpm–200 lpm=60 lpm).

Thus, in the case of a combined operation of the first actuator and the second actuator, the movement of the second flow control valve may cause working fluid having a flow rate of 200 lpm to be supplied to the first working fluid supply 110, even in the case in which working fluid having a flow rate of 60 lpm, discharged by the second working fluid supply 210, is not supplied to the option actuator 150 through the confluence path. This can consequently minimize decreases in the workability of the option working device.

The hydraulic machine may include at least one flow control valve (not shown) additionally located on the first working fluid path 130, as well as a manipulator (not shown) and an actuator (not shown), corresponding to the additional flow control valve. Likewise, the hydraulic machine may include at least one flow control valve (not shown), additionally located on the second working fluid path 230, as well as a manipulator (not shown) and an actuator (not shown), corresponding to the additional flow control valve. Even in the case in which at least one of these manipulators requests at least one of the first working fluid supply 110 and the second working fluid supply 210 to discharge working fluid at an additional flow rate, independently of the first flow rate and the second flow rate, the controller 20 may control the first working fluid supply 110 and the second working fluid supply 210 such that the first working fluid supply 110 discharges working fluid at a flow rate equal to or lower than the first maximum allowable flow rate when the first maximum allowable flow rate is equal to or lower than the first capacity and the first working fluid supply 110 and the second working fluid supply 210 discharges working fluid at a combined flow rate equal to or lower than the first maximum allowable flow rate when the first maximum allowable flow rate is higher than the first capacity.

FIG. 5 is a flowchart schematically illustrating a flow rate control algorithm performed in the hydraulic machine according to exemplary embodiments.

Although the embodiments illustrated in FIG. 5 have a different flow control algorithm from the embodiments illustrated in FIG. 3, such algorithms may be embodied using the same or similar device configurations. Thus, descriptions of some features will be omitted when they are identical to those of the embodiments described above with reference to FIG. 3.

The control algorithm will be sequentially described with reference to FIG. 5 together with FIGS. 6 to 10.

First, an operator sets a first maximum allowable flow rate using the first input device 30 or the hydraulic machine automatically sets the first maximum allowable flow rate by recognizing an option working device.

When a first signal is detected, i.e. the first manipulator is detected as being manipulated, it is determined whether or not the first maximum allowable flow rate is higher than a first capacity.

When the first maximum allowable flow rate is determined not to be higher than the first capacity, the bypass cutoff valve 50 may be opened (or be maintained in an open state), and the controller 20 may control the first working fluid supply 110 to discharge working fluid at a first required flow rate and the second working fluid supply 210 to discharge working fluid at a second required flow rate.

In contrast, when the first maximum allowable flow rate is determined to be higher than the first capacity of the first working fluid supply 110, the bypass cutoff valve 50 may be closed, and the controller 20 may control the first working fluid supply 110 to discharge working fluid at a first flow rate equal to or lower than the first capacity and the second working fluid supply 210 to discharge working fluid at a second flow rate equal to a lower flow rate between a flow rate obtained by deducing the first flow rate from the first required flow rate, added to the second required flow rate, and a flow rate of a second capacity.

When the first maximum allowable flow rate is higher than the first capacity, the value of the first signal is a maximum level, and the value of the second signal is equal to or higher than a minimum level and equal to or lower than a maximum level, the first working fluid supply may be controlled to discharge working fluid at a flow rate of the first capacity, while the second working fluid supply may be controlled to discharge working fluid at a flow rate equal to a lower flow rate between a flow rate obtained by deducing the first flow rate from the first maximum allowable flow rate, added to the second required flow rate, and the flow rate of the second capacity.

An exemplary relationship between a flow rate of fluid discharged by the first working fluid supply and a flow rate of fluid discharged by the second working fluid supply in response to a first signal generated by the first manipulator when the first maximum allowable flow rate is higher than the first capacity will be described with reference to FIG. 4.

For example, when the first maximum allowable flow rate is 260 lpm and the first capacity is 200 lpm, manipulating the first manipulator alone (e.g. first signal=a<b) may cause the first working fluid supply 110 to discharge working fluid at the flow rate d, lower than the first capacity, and the second working fluid supply 210 to discharge working fluid at the flow rate c.

For example, when the first maximum allowable flow rate is 260 lpm and the first capacity is 200 lpm, simultaneously manipulating the first manipulator (e.g. first signal=a) and the second manipulator may cause the first working fluid supply 110 to discharge working fluid at the flow rate d, lower than the first capacity, and the second working fluid supply 210 to discharge working fluid at a flow rate obtained by adding the flow rate c and the second required flow rate.

For example, when the first maximum allowable flow rate is 260 lpm and the first capacity is 200 lpm, manipulating the first manipulator to a maximum displacement such that the first required flow rate is substantially the same as the first maximum allowable flow rate (first signal=b) and simultaneously manipulating the second manipulator may cause the first working fluid supply 110 to discharge working fluid at a flow rate equal to the first capacity, i.e. 200 lpm, and the second working fluid supply 210 to discharge working fluid at a flow rate obtained by deducting the first capacity from the first required flow rate, added to the second required flow rate (=260 lpm−200 lpm+second required flow rate).

Consequently, it is possible to supply working fluid at a flow rate as high as possible, required by the option actuator 150 and the second actuator 250, thereby improving workability compared to the embodiments as described above with reference to FIG. 3.

Configurations of the hydraulic machine according to a variety of embodiments for realizing the algorithms illustrated in FIGS. 3 and 5 will be described with reference to FIGS. 6 to 10. Since common features have been discussed above with reference to FIG. 3, the following descriptions will be given mainly with regard to characteristic features of the embodiments related to the drawings.

FIG. 6 is a diagram schematically illustrating a configuration of the hydraulic machine according to exemplary embodiments.

As illustrated in FIG. 6, the hydraulic machine may include the first pressure sensor 170 and the second pressure sensor 270.

As illustrated in FIG. 6, the first manipulator 160 may generate a first signal as a hydraulic signal. The first manipulator 160 may include a manipulator, such as a lever or a pedal, and a pressure-reducing valve. In response to the manipulator being manipulated, the pressure-reducing valve (not shown) may be moved and may generate a hydraulic signal based on a displacement thereof. The hydraulic signal may be applied to the first flow control valve 140 to move the first flow control valve 140. The generated hydraulic signal may be detected by the first pressure sensor 170, which in turn may transmit an electrical signal, corresponding to the hydraulic signal, to the controller 20. The second manipulator 260 may also generate a second signal as a hydraulic signal. The generated hydraulic signal may be detected by the second pressure sensor 270, which in turn may transmit an electrical signal, corresponding to the hydraulic signal, to the controller 20.

The hydraulic machine may include a first pilot fluid path 175 extending between a pressure-reducing valve of the first manipulator 160 and the first flow control valve 140. The hydraulic machine may include a second pilot pressure path 75 connecting the first pilot fluid path 175 and the bypass cutoff valve 50. Likewise, the hydraulic machine may include a pilot fluid path extending between a pressure-reducing valve of the second manipulator 260 and the second flow control valve 240.

As illustrated in FIG. 6, the control valve 60 may be located on the second pilot fluid path 75. The control valve 60 may be a simple solenoid valve opening or closing the second pilot fluid path 75 in response to an electrical signal applied thereto. Thus, when the control valve 60 is opened, the first signal generated by the first manipulator 160 may be applied to the bypass cutoff valve 50 through the second pilot fluid path 75.

The confluence path 40 may be connected to the second working fluid path 230, in a location downstream of the second flow control valve 240.

FIG. 7 is a diagram schematically illustrating a configuration of the hydraulic machine according to exemplary embodiments.

As illustrated in FIG. 7, the hydraulic machine may include an electro-proportional pressure-reducing valve 180 moving the first flow control valve 140 by applying an amount of pilot pressure to the first flow control valve 140. The hydraulic machine may include the first pilot fluid path 175 extending between the electro-proportional pressure-reducing valve 180 and the first flow control valve 140. The hydraulic machine may include the second pilot fluid path 75 connecting the first pilot fluid path 175 and the bypass cutoff valve 50. The control valve 60 may be located on the second pilot fluid path 75 to open and cut off the second pilot fluid path 75.

The first manipulator 160 may generate a first signal as an electrical signal. The first manipulator 160 may include a manipulation portion, such as a lever, a pedal, or a wheel, and an electrical signal generator. The electrical signal generator may generate an electrical signal corresponding to an amount by which the manipulation portion is manipulated. The electrical signal may be transmitted to the controller 20, which in turn may provide a corresponding electrical signal to the electro-proportional pressure-reducing valve 180 to operate the electro-proportional pressure-reducing valve 180. The electro-proportional pressure-reducing valve 180 may apply a pilot pressure, corresponding to the electrical signal, to the first control valve 60.

FIG. 8 is a diagram schematically illustrating a configuration of the hydraulic machine according to exemplary embodiments.

As illustrated in FIG. 8, the first manipulator 160 may generate a first signal as a hydraulic signal. The generated hydraulic signal may be detected by the first pressure sensor 170, which in turn may transmit a corresponding electrical signal to the controller 20. The controller 20 may apply the corresponding electrical signal to the control valve 60.

The control valve 60 may include an electro-proportional pressure-reducing valve. When the controller 20 applies an electrical signal to the control valve 60, the control valve 60 may be opened or closed by a degree corresponding to the electrical signal to apply a corresponding level of pilot pressure to the bypass cutoff valve 50.

FIG. 9 is a diagram schematically illustrating a configuration of the hydraulic machine according to exemplary embodiments.

As illustrated in FIG. 9, the first manipulator 160 may generate a first signal as an electrical signal. The first manipulator may transmit the generated electrical signal to the controller 20. The controller 20 may apply a corresponding electrical signal to the control valve 60.

The control valve 60 may include an electro-proportional pressure-reducing valve. When the controller 20 applies an electrical signal to the control valve 60, the control valve 60 may be opened or closed by a degree corresponding to the electrical signal to apply a corresponding level of pilot pressure to the bypass cutoff valve 50.

FIG. 10 is a diagram schematically illustrating a configuration of the hydraulic machine according to exemplary embodiments.

The confluence path 40 may be connected to the second working fluid path 230, in a location upstream of the second flow control valve 240. Although the location of the connection of the confluence path 40 is discussed as a modification to the embodiments described with reference to FIG. 9, the same may be applied to the embodiments described with reference to FIGS. 6 to 8.

Since the confluence path 40 is connected to the second working fluid path 230, in a location downstream of the second flow control valve 240, in the embodiments described with reference to FIG. 9, working fluid cannot be supplied to the option actuator 150 through the confluence path 40 when the second working fluid path 230 is cut off in response to the second flow control valve 240 being moved. Thus, as illustrated in FIG. 10, it is possible to further improve the workability of the option working device by connecting the confluence path 40 to the second working fluid path 230, in a location upstream of the second flow control valve 240.

FIG. 11 is a flowchart schematically illustrating a flow rate control algorithm performed in the hydraulic machine according to exemplary embodiments.

Referring to FIG. 11 together with FIGS. 14 to 16, the hydraulic machine may include the first working fluid supply 110, the first actuator 150, a third actuator 350, the first flow control valve 140, a third flow control valve 340, the first manipulator 160, a third manipulator 360, and the controller 20.

The first flow control valve 140 may control a flow of working fluid directed from the first working fluid supply 110 to the first actuator 150.

The third flow control valve 340 may control a flow of working fluid directed from the first working fluid supply 110 to the third actuator 350.

The first manipulator 160 may generate a first signal by which the degree of opening of the first flow control valve 140 is adjusted.

The third manipulator 360 may generate a third signal by which the degree of opening of the third flow control valve 340 is adjusted. As illustrated in FIGS. 14 to 16, the third manipulator 360 may generate a third signal as a hydraulic signal. As an alternative, the third manipulator 360 may generate the third signal as an electrical signal. The generated electrical signal may be transmitted to the controller 20, which in turn may apply a corresponding electrical signal to the electro-proportional pressure-reducing valve (not shown).

The first actuator 150 may be an option actuator driving the option working device.

The controller 20 may calculate the first required flow rate as a function of the first maximum allowable flow rate and a value of the first signal and calculate a third required flow rate as a function of a value of the third signal. The controller 20 may control the first working fluid supply 110 to supply working fluid to the first actuator 150 at the first required flow rate and working fluid to the third actuator 350 at the third required flow rate.

For example, when the first capacity of the first working fluid supply 110 is 200 lpm and the first maximum allowable flow rate is 80 lpm, manipulating the option working device alone may limit the flow rate of working fluid discharged by the first working fluid supply 110 to be 80 lpm. In the case in which the first manipulator 160 and the third manipulator 360 are simultaneously manipulated, when the required flow rate of the first actuator 150 is 80 lpm and the required flow rate of the third actuator 350 is 100 lpm, the first working fluid supply 110 may discharge working fluid at a flow rate of 180 lpm so that a flow rate of 100 lpm is supplied to the third actuator 350 and a flow rate of 80 lpm is supplied to the first actuator 150. It is thereby possible to supply working fluid at a significantly higher flow rate than in the related art, thereby obtaining efficient workability.

FIG. 12 is a flowchart schematically illustrating a flow rate control algorithm performed in the hydraulic machine according to exemplary embodiments.

Referring to FIG. 12 together with FIGS. 15 and 16, the controller 20 may adjust the degree of opening of the first flow control valve 140 as a function of a value of a first signal and a gain value.

In the case in which the first working fluid supply 110 supplies working fluid to the third actuator 350 and the first actuator 150, when a load pressure applied to the third actuator 350 is higher than a load pressure applied to the first actuator 150, a maximal amount of working fluid discharged by the first working fluid supply 110 may be introduced into the first actuator 150. In this case, the flow rate of working fluid supplied to the first actuator 150 is higher than the first maximum allowable flow rate, so that the first actuator 150 may be damaged. In addition, the third actuator 350 may not be supplied with working fluid at a flow rate intended by the operator, so that there may be an adverse effect on the operability of the third actuator 350. To prevent such problems, a value obtained by multiplying a value of a first signal (i.e. a value input into the controller 20) with a gain value K may be sent to the electro-proportional pressure-reducing valve 180 as an output value. The gain value may be lower than 1. When the value of the first signal is the same (i.e. the amount by which the manipulation portion is manipulated is the same), an electrical signal, the value of which is lower than the value of the electrical signal discussed in the foregoing embodiments with reference to FIG. 11, may be applied to the electro-proportional pressure-reducing valve 180, which in turn may apply pilot pressure Pi' to the first flow control valve 140, the pilot pressure Pi' being lower than the pilot pressure Pi discussed in the foregoing embodiments with reference to FIG. 11. Thus, the degree of opening of the first flow control valve 140 may be reduced, thereby reducing the amount of working fluid supplied to the first actuator 150 while increasing the amount of working fluid supplied to the third actuator 350. It is therefore possible to suitably distribute flow rates of working fluid to the third actuator 350 and the first actuator 150, thereby controlling the flow rate of working fluid directed to the first actuator 150.

FIG. 13 is a graph illustrating an exemplary relationship between a third signal of the third manipulator and a gain value.

The controller may calculate a gain value as a function of a value of a third signal and send a value obtained by multiplying a value of a first signal with the calculated gain value, as described above, to the electro-proportional pressure-reducing valve. As described above, the higher the value of the third signal is, i.e. the higher the degree of opening of the third flow control valve is, the lower the gain value may be. Consequently, the higher value of the third signal can further reduce the value of the first signal, i.e. the degree of opening of the first flow control valve, than the lower value of the third signal.

Configurations of the hydraulic machines according to a variety of embodiments for realizing the algorithms illustrated in FIGS. 11 and 12 will be described with reference to FIGS. 14 to 16. Since common features have been discussed above, the following descriptions will be given mainly with regard to characteristic features of the embodiments related to the drawings.

FIG. 14 is a diagram schematically illustrating a configuration of the hydraulic machine according to exemplary embodiments.

As illustrated in FIG. 14, the first manipulator 160 may generate a first signal as a hydraulic signal. The first pressure sensor 170 may detect the first signal and transmit an electrical signal, corresponding to the first signal, to the controller 20.

FIG. 15 is a diagram schematically illustrating a configuration of the hydraulic machine according to exemplary embodiments.

As illustrated in FIG. 15, the hydraulic machine may further include a third pilot fluid path 177 connecting the first manipulator 160 and the first flow control valve 140 and an electro-proportional pressure-reducing valve 181 located on the third pilot fluid path 177. The controller 20 may control the electro-proportional pressure-reducing valve 181 such that the degree of opening of the first flow control valve 140 is adjusted depending on a function of a value of a first signal and a gain value.

The hydraulic machine may include a second input device 80 with which a gain value of a current output to the electro-proportional pressure-reducing valve 181 with respect to the value of the first signal is set.

FIG. 16 is a diagram schematically illustrating a configuration of the hydraulic machine according to exemplary embodiments.

As illustrated in FIG. 16, the hydraulic machine may include the electro-proportional pressure-reducing valve 180 connected to the first flow control valve 140 to operate the first flow control valve 140. The first manipulator 160 may generate a first signal as an electrical signal and provide the first signal to the controller 20. The controller 20 may operate the electro-proportional pressure-reducing valve 180 by applying an electrical signal, corresponding to the first signal, to the electro-proportional pressure-reducing valve 180.

The hydraulic machine may include the second input device 80 with which a gain value of a current output to the electro-proportional pressure-reducing valve 180 with respect to the value of the first signal is set.

The invention claimed is:

1. A hydraulic machine comprising:
a first working fluid supply, with a maximum flow rate dischargeable therefrom being equal to a first capacity;
a second working fluid supply;
a first working fluid path extending from the first working fluid supply;
a second working fluid path extending from the second working fluid supply;
a confluence path connecting the first working fluid path and the second working fluid path to selectively allow working fluid from the second working fluid path to be combined with working fluid in the first working fluid path;
a first flow control valve located on the first working fluid path to be movable from a first position to a second position to direct working fluid from the first working fluid path to a first actuator;
a second flow control valve located on the second working fluid path to be movable from a first position to a second position to direct working fluid from the second working fluid path to a second actuator;
a first manipulator generating a first signal to adjust a displacement of the first flow control valve;
a second manipulator generating a second signal to adjust a displacement of the second flow control valve; and
a controller,
wherein the first actuator comprises an option actuator, with a maximum flow rate allowed to be supplied thereto being preset to be a first maximum allowable flow rate, and
the controller controls the first working fluid supply and the second working fluid supply such that the first working fluid supply discharges working fluid at a flow rate equal to the first capacity and the second working fluid supply discharges working fluid at a flow rate obtained by deducting the first capacity from the first maximum allowable flow rate when the first maximum allowable flow rate is higher than the first capacity, a value of the first signal is a maximum level, and a value of the second signal is equal to or higher than a minimum level and equal to or lower than a maximum level.

2. The hydraulic machine of claim 1, wherein the first maximum allowable flow rate is required to be higher than the first capacity to allow working fluid from the second working fluid path to be combined with working fluid in the first working fluid path.

3. The hydraulic machine of claim 1, further comprising an input device with which the first maximum allowable flow rate is set.

4. The hydraulic machine of claim 1, wherein the confluence path is connected to the second working fluid path at a location upstream or downstream of the second flow control valve.

5. The hydraulic machine of claim 1, further comprising a bypass cutoff valve opening and closing the second working fluid path, downstream of a location in which the second flow control valve and the confluence path are connected,
wherein the bypass cutoff valve cuts off at least a portion of the second working fluid path to allow working fluid from the second working fluid path to be combined with working fluid in the first working fluid path.

6. The hydraulic machine of claim 5, wherein the bypass cutoff valve adjusts a degree of closing of the second working fluid path, as a function of the value of the first signal.

7. The hydraulic machine of claim 5, further comprising a control valve connected to the bypass cutoff valve to operate the bypass cutoff valve by applying pilot pressure to the bypass cutoff valve.

8. The hydraulic machine of claim 7, wherein the first manipulator comprises a pressure-reducing valve,
the hydraulic machine further comprising:
a first pilot fluid path extending between the pressure-reducing valve and the first flow control valve; and
a second pilot fluid path connecting the first pilot fluid path and the bypass cutoff valve,
wherein the control valve is located on the second pilot fluid path to close the second pilot fluid path or open the second pilot fluid path to apply the pilot pressure to the bypass cutoff valve.

9. The hydraulic machine of claim 8, wherein the controller closes the control valve when the first maximum allowable flow rate is equal to or lower than the first capacity and opens the control valve when the first maximum allowable flow rate is higher than the first capacity.

10. The hydraulic machine of claim 7, further comprising:
an electro-proportional pressure-reducing valve operating the first flow control valve;
a first pilot fluid path extending between the pressure-reducing valve and the first flow control valve; and
a second pilot fluid path connecting the first pilot fluid path and the bypass cutoff valve,
wherein the first manipulator generates the first signal as an electrical signal and sends the electrical signal to the controller,
the controller operates the electro-proportional pressure-reducing valve by applying an electrical signal, corresponding to the first signal, to the electro-proportional pressure-reducing valve, and
the control valve is located on the second pilot fluid path to open and close the second pilot fluid path.

11. The hydraulic machine of claim 7, wherein the control valve comprises an electro-proportional pressure-reducing valve,
the first manipulator generates the first signal as an electrical signal and sends the electrical signal to the controller, and
the controller sends an electrical signal, corresponding to the first signal, to the electro-proportional pressure-reducing valve.

12. A hydraulic machine comprising:
a first working fluid supply, with a maximum flow rate dischargeable therefrom being equal to a first capacity;
a second working fluid supply, with a maximum flow rate dischargeable therefrom being equal to a second capacity;
a first working fluid path extending from the first working fluid supply;
a second working fluid path extending from the second working fluid supply;
a confluence path connecting the first working fluid path and the second working fluid path to selectively allow working fluid from the second working fluid path to be combined with working fluid in the first working fluid path;
a first flow control valve located on the first working fluid path to be movable from a first position to a second position to direct working fluid from the first working fluid path to a first actuator;
a second flow control valve located on the second working fluid path to be movable from a first position to a second position to direct working fluid from the second working fluid path to a second actuator;
a first manipulator generating a first signal to adjust a displacement of the first flow control valve;
a second manipulator generating a second signal to adjust a displacement of the second flow control valve; and
a controller,
wherein the first actuator comprises an option actuator, with a maximum flow rate allowed to be supplied thereto being preset to be a first maximum allowable flow rate, and
the controller calculates a first required flow rate as a function of the first maximum allowable flow rate and a value of the first signal, calculates a second required flow rate as a function of a value of the second signal, and controls the first working fluid supply and the second working fluid supply such that the first working fluid supply discharges working fluid at a flow rate equal to the first capacity and the second working fluid supply discharges working fluid at a flow rate obtained by deducting the first capacity from the first maximum allowable flow rate, added to the second required flow rate, when the first maximum allowable flow rate is higher than the first capacity, the value of the first signal is a maximum level, and the value of the second signal is equal to or higher than a minimum level and equal to or lower than a maximum level.

13. A hydraulic machine comprising:
a first working fluid supply;
a first flow control valve adjusting a flow of working fluid directed from the first working fluid supply to a first actuator;
a third flow control valve adjusting a flow of working fluid directed from the first working fluid supply to a third actuator;
a first manipulator generating a first signal to adjust a degree of opening of the first flow control valve;
a third manipulator generating a third signal to adjust a degree of opening of the third flow control valve; and
a controller,
wherein the first actuator comprises an option actuator, with a maximum flow rate allowed to be supplied thereto being preset to be a first maximum allowable flow rate, and
the controller calculates a first required flow rate as a function of the first maximum allowable flow rate and a value of the first signal and calculates a third required flow rate as a function of a value of the third signal, and controls the first working fluid supply to discharge working fluid at a flow rate obtained by adding the first required flow rate and the third required flow rate.

14. The hydraulic machine of claim 13, further comprising an electro-proportional pressure-reducing valve connected to the first flow control valve to operate the first flow control valve,
wherein the first manipulator generates the first signal as an electrical signal and sends the electrical signal to the controller, and
the controller operates the electro-proportional pressure-reducing valve by applying an electrical signal, corresponding to the first signal, to the electro-proportional pressure-reducing valve.

15. The hydraulic machine of claim 14, wherein the controller controls the electro-proportional pressure-reducing valve such that the degree of opening of the first flow control valve is adjusted as a function of the value of the first signal and a gain value.

16. The hydraulic machine of claim 15, wherein the controller calculates the gain value as a function of a value of the third signal.

17. The hydraulic machine of claim 13, further comprising:
a third pilot fluid path connecting the first manipulator and the first flow control valve; and
an electro-proportional pressure-reducing valve located on the third pilot fluid path,
wherein the controller controls the electro-proportional pressure-reducing valve such that the degree of opening of the first flow control valve is adjusted as a function of the value of the first signal and a gain value.

* * * * *